US012596251B2

(12) United States Patent
Ha et al.

(10) Patent No.: US 12,596,251 B2
(45) Date of Patent: Apr. 7, 2026

(54) OPTICAL DEVICE FOR EXIT PUPIL EXPANSION (EPE) AND DISPLAY APPARATUS INCLUDING THE OPTICAL DEVICE

(71) Applicant: SAMSUNG ELECTRONICS CO., LTD., Suwon-si (KR)

(72) Inventors: Sangwoo Ha, Seongnam-si (KR); Tetsuo Ariyoshi, Seongnam-si (KR); Heejin Kim, Yongin-si (KR); Soomoon Park, Seoul (KR); Jongpil Won, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 751 days.

(21) Appl. No.: 17/587,245

(22) Filed: Jan. 28, 2022

(65) Prior Publication Data
US 2023/0008461 A1    Jan. 12, 2023

(30) Foreign Application Priority Data
Jul. 9, 2021    (KR) ........................ 10-2021-0090546

(51) Int. Cl.
*G02B 27/00*    (2006.01)
*G02B 27/01*    (2006.01)
*G02B 27/09*    (2006.01)

(52) U.S. Cl.
CPC ..... *G02B 27/0081* (2013.01); *G02B 27/0172* (2013.01); *G02B 27/0944* (2013.01); *G02B 2027/0174* (2013.01)

(58) Field of Classification Search
CPC .... G02B 27/01–0189; G02B 2027/0105–0198
See application file for complete search history.

(56) References Cited

U.S. PATENT DOCUMENTS

| | | | |
|---|---|---|---|
| 6,372,608 | B1 | 4/2002 | Shimoda et al. |
| 6,645,830 | B2 | 11/2003 | Shimoda et al. |
| RE38,466 | E | 3/2004 | Inoue et al. |
| 6,818,465 | B2 | 11/2004 | Biwa et al. |
| 6,818,530 | B2 | 11/2004 | Shimoda et al. |
| 6,858,081 | B2 | 2/2005 | Biwa et al. |

(Continued)

FOREIGN PATENT DOCUMENTS

| | | |
|---|---|---|
| CN | 110543022 A | 12/2019 |
| KR | 10-2020-0110183 A | 9/2020 |

OTHER PUBLICATIONS

Communication dated Sep. 15, 2025 issued by the German Patent and Trademark Office in German Patent Application No. 102022115571.4.

(Continued)

*Primary Examiner* — Christopher A Lamb, II
(74) *Attorney, Agent, or Firm* — Sughrue Mion, PLLC

(57)    ABSTRACT

An optical device for exit pupil expansion (EPE) for improving a field of view (FOV) and luminance uniformity, and a display apparatus including the same are provided. The optical device includes: an input part into which a virtual image is input; and an EPE part configured to receive the virtual image from the input part, perform one-dimensional (1D) EPE and two-dimensional (2D) EPE to combine the virtual image with an external real image, and output the combined image.

16 Claims, 19 Drawing Sheets

(56)     References Cited

U.S. PATENT DOCUMENTS

| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,735,931 B2 | 5/2014 | Han et al. |
| 8,766,295 B2 | 7/2014 | Kim |
| 10,175,478 B2 | 1/2019 | Tekolste et al. |
| 10,935,730 B1 | 3/2021 | Lou et al. |
| 10,969,585 B2 | 4/2021 | Tervo |
| 2018/0052501 A1* | 2/2018 | Jones, Jr. ............. G02B 5/1857 |
| 2019/0121027 A1 | 4/2019 | Popovich et al. |
| 2019/0187474 A1* | 6/2019 | Bhargava ........... G02B 27/0955 |
| 2020/0209630 A1 | 7/2020 | Schultz et al. |
| 2020/0278543 A1 | 9/2020 | Schultz et al. |
| 2020/0409148 A1 | 12/2020 | Alasaarela et al. |
| 2021/0041704 A1 | 2/2021 | Bhargava et al. |
| 2021/0055551 A1 | 2/2021 | Chi et al. |
| 2021/0063672 A1 | 3/2021 | Bodiya et al. |
| 2024/0094456 A1* | 3/2024 | Schultz ................ G02B 5/1819 |

OTHER PUBLICATIONS

Communication issued on Jan. 22, 2026 by the Korean Ministry of Intellectual Property (MOIP) in Korean Patent Application No. 10-2021-0090546.

* cited by examiner

OPTICAL DEVICE FOR EXIT PUPIL EXPANSION (EPE) AND DISPLAY APPARATUS INCLUDING THE OPTICAL DEVICE

CROSS-REFERENCE TO RELATED APPLICATION

This application is based on and claims priority under 35 U.S.C. § 119 to Korean Patent Application No. 10-2021-0090546, filed on Jul. 9, 2021, in the Korean Intellectual Property Office, the disclosure of which is incorporated by reference herein in its entirety.

BACKGROUND

The inventive concept relates to an optical device expanding an exit pupil or an eye box and a display apparatus including the optical device.

A visual optical device such as an augmented reality (AR) device or a lens of an optical device is progressively improving. The most important characteristic parameters of the visual optical element are the size of a field of view (FOV) and the size of an eye box. However, it is not easy to implement a visual optical device having a wide FOV and a large eye box while maintaining high image quality, resolution, and luminance. Accordingly, for the expansion of the eye box, an exit pupil expansion (EPE) technique using a diffractive element or an optical beam expansion technique using a translucent mirror may be used to improve image quality, resolution and luminance.

SUMMARY

The inventive concept provides an optical device for exit pupil expansion (EPE) capable of improving a field of view (FOV) and luminance uniformity while embodying eye box expansion, and a display apparatus including the optical device.

The inventive concept is not limited to the above described concepts, and other features, aspects and advantages will be apparent to those skilled in the art from the following description.

According to an embodiment, there is provided an optical device for exit pupil expansion (EPE) including: an input part into which a virtual image is input; and an EPE part configured to receive the virtual image from the input part, perform one-dimensional (1D) EPE and two-dimensional (2D) EPE to combine the virtual image with an external real image, and output the combined image.

According to an embodiment, there is provided a display apparatus including: an image generator configured to generate a virtual image; and an optical device for exit pupil expansion (EPE) configured to receive the virtual image and perform the EPE to combine the virtual image with an external real image. The optical device includes: an input part into which the virtual image is input; and an EPE part configured to receive the virtual image from the input part, perform one-dimensional (1D) EPE and two-dimensional (2D) EPE to combine the virtual image with the external real image, and output the combined image.

According to an embodiment, there is provided a display apparatus including: an image generator configured to generate a virtual image: an optical device for exit pupil expansion (EPE) configured to receive the virtual image and perform the EPE to combine the virtual image with an external real image; and a body onto which the image generator and the optical device for EPE are mounted. The optical device for EPE includes: an input part into which the virtual image is input; and an EPE part configured to receive the virtual image from the input part, perform one-dimensional 1D EPE and two-dimensional (2D) EPE to combine the virtual image with the external real image, and output the combined image.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1A:
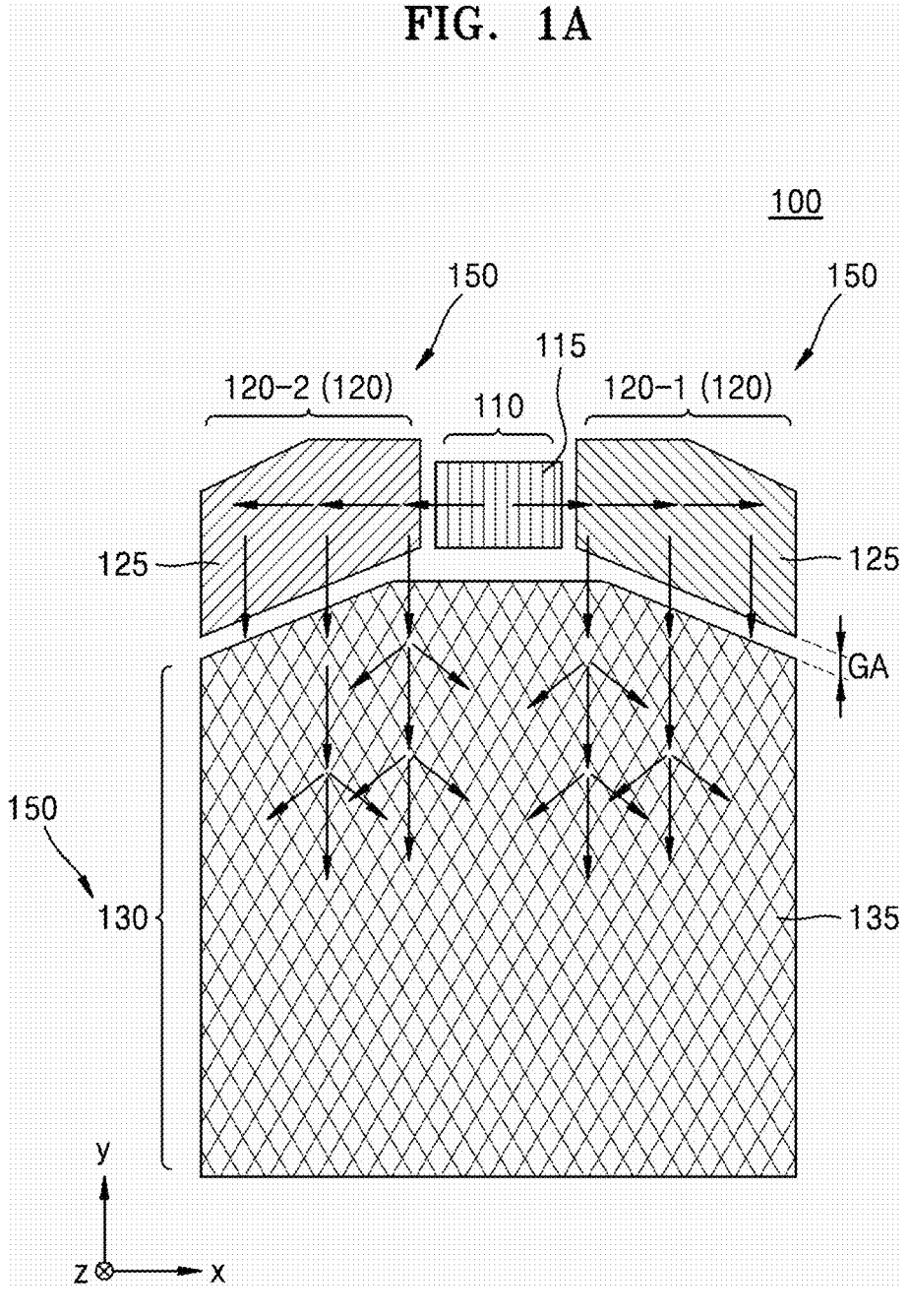
FIGS. 1A to 1D are plan views and enlarged plan views of an optical device for exit pupil expansion (EPE), according to an embodiment.

Hereinafter, embodiments will be described in detail with reference to the accompanying drawings. In the drawings, like numerals denote like elements and redundant descriptions thereof will be omitted.

Figures 1B, 1C:
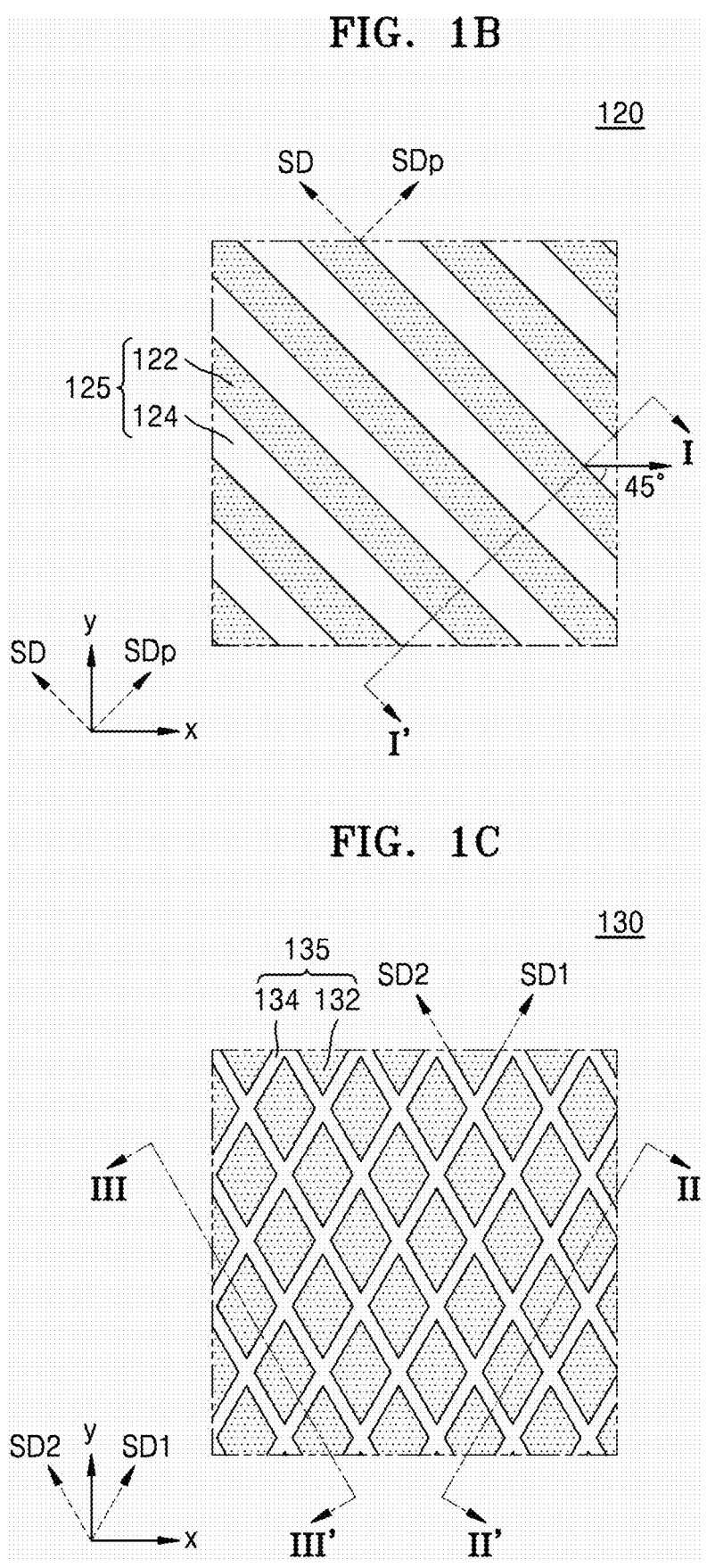
Figures 1D, 2A:
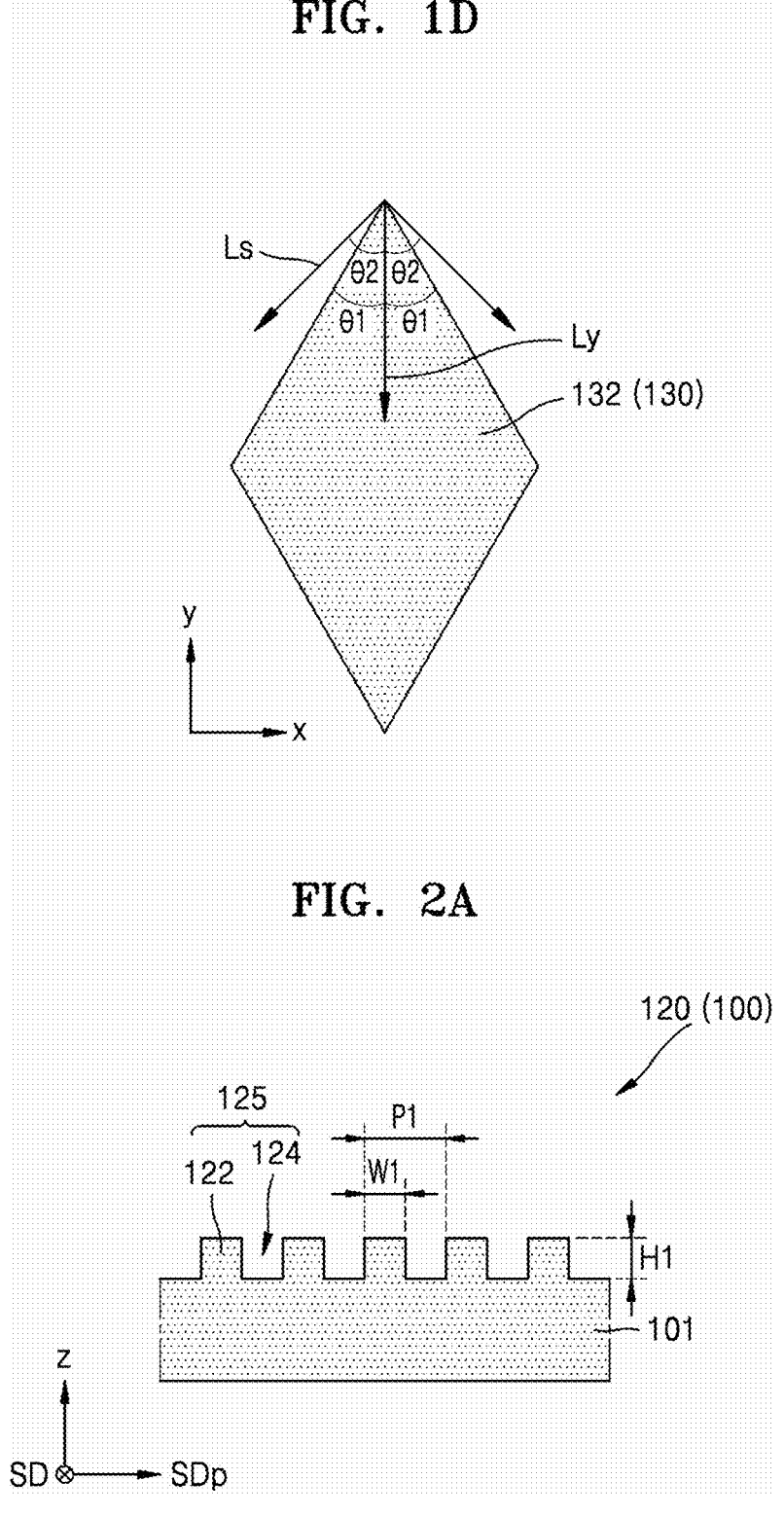
FIGS. 2A to 2C are cross-sectional views taken along a line I-I' of FIG. 1B, according to various embodiments.

FIGS. 1A to 1D are plan views and enlarged plan views of an optical device for exit pupil expansion (EPE) according to an embodiment. FIGS. 1B and 1C are enlarged plan views of a one-dimensional (1D) EPE area and a two-dimensional (2D) EPE area of the optical device for EPE of FIG. 1A, respectively, and FIG. 1D is an enlarged plan view of a rhombus grating portion of the 2D EPE area.

Referring to FIGS. 1A and 1D, an optical device for EPE 100 may include an input part 110 and an EPE part 150. The optical device for EPE 100 may be, for example, a coupler of a waveguide type. Accordingly, the input part 110 and the EPE part 150 may be embodied through a diffraction grating formed in a waveguide 101 (see FIG. 2A).

The waveguide 101 is an optical waveguide that transmits light, and may include a material transparent to visible light. For example, the waveguide 101 may include a material such as glass, poly methyl methacrylate (PMMA), or polydi-methylsiloxane (PDMS). However, a material of the waveguide 101 is not limited to these materials. Also, the waveguide 101 may include a flat plate shape having flat surfaces. The waveguide 101 may include a first surface 101a (see FIG. 5) and a second surface 101b (see FIG. 5) that is opposite from the first surface 101a. The diffraction grating may be formed on the first surface 101a of the waveguide 101. However, a surface on which the diffraction grating is formed is not limited to the first surface 101a. Total reflection may occur at the first and second surfaces 101a and 101b of the waveguide 101. In addition, light may be input or output to or from a diffraction grating portion. That is, light may be input or output to or from a diffraction grating portion through in-coupling and out-coupling of light. Also, light may be diffracted in the diffraction grating portion to achieve EPE.

The input part 110 may be a portion into which external light is input. That is, light may be input into the waveguide 101 through in-coupling by the diffraction grating. For example, the input part 110 may be embodied through a line-shaped diffraction grating, that is, a line grating 115, formed on the first surface 101a of the waveguide 101. Specifically, the input part 110 may include the line grating 115 that allows light incident in a direction perpendicular to the first surface 101a of the waveguide 101 to travel into the waveguide 101 in a direction parallel to the first surface 101a.

The line grating 115 of the input part 110 will be described in more detail hereafter. For example, when the direction perpendicular to the first surface 101a of the waveguide 101 is referred to as a third direction (z direction), the input part 110 may include a line-shaped diffraction grating, that is, the line grating 115, extending in a second direction (y direction) and having a certain pitch in a first direction (x direction). External light may be input to the input part 110 in the third direction (z direction), and bent through the line grating 115 to travel into the waveguide 101 in the first direction (x direction). In addition, the line grating 115 of the input part 110 may have a shape similar to that of a line grating 125 of a 1D EPE area 120 of the EPE part 150. Thus, a cross-sectional shape of the line grating 115 of the input part 110 may be understood as a cross-sectional shape of the line grating 125 of 1D EPE areas 120-1 and 120-2 (also referred to as a first 1D EPE area 120-1 and a second 1D EPE area 120-2, respectively) of FIGS. 2A to 2C.

The input part 110 may be embodied through other optical devices as well as a line grating. For example, the input part 110 may include a mirror, a prism, or the like.

The EPE part 150 may include the 1D EPE area 120 and a 2D EPE area 130. The 1D EPE area 120 may be an area where 1D EPE is realized (or performed). The 1D EPE may mean one-dimensionally expanding of an exit pupil by outputting light in such a way that light travels through the waveguide 101 in one direction, wherein a part of the light is output due to out-coupling by the diffraction grating and another part thereof travels therethrough. Because 1D EPE is known technology, a detailed description thereof is omitted. However, an output by 1D EPE from the 1D EPE area 120 according to an embodiment may be output to the 2D EPE area 130 rather than being output to the outside of the waveguide 101. In addition, 1D EPE may be realized through out-coupling by a translucent mirror, a holographic optical element (HOE), or the like as well as the diffraction grating.

The 1D EPE area 120 may be arranged on both sides of the input part 110 in the first direction (x direction). For example, the 1D EPE area 120 may include the first 1D EPE area 120-1 on a right side of the input part 110 in the first direction (x direction) and the second 1D EPE area 120-2 on a left side of the input part 110. According to an embodiment, the 1D EPE area 120 may be arranged at one side of the input part 110 in the first direction (x direction).

Similar to the input part 110, the 1D EPE area 120 may include a line-shaped diffraction grating, that is, the line grating 125. The line grating 125 may include a line-shaped protrusion 122 and a line-shaped space 124. The line grating 125 in the 1D EPE area 120 extends in a slope direction SD having a slope of 45° with respect to the first direction (x direction), and may have a certain pitch in a vertical slope direction SDp perpendicular to the slope direction SD. Here, the slope direction SD and the vertical slope direction SDp may be defined on a plane by the first direction (x direction) and the second direction (y direction), respectively, and the slope direction SD and the vertical slope direction SDp may be perpendicular to the third direction (z direction). According to an embodiment, the line grating 125 may extend with a slope greater than or less than 45° with respect to the first direction (x direction). The cross-sectional shape of the line grating 125 is described in more detail with reference to FIGS. 2A to 2C.

As indicated by an arrow of FIG. 1A, light from the outside is input to the waveguide 101 through the input part 110, wherein the light is bent by the line grating 115 in the input part 110 and travels to both sides of the first direction (x direction) to enter the 1D EPE area 120. Also, the light is output through out-coupling while 1D EPE is realized in the 1D EPE area 120, and enters the 2D EPE area 130.

The 2D EPE area 130 may be an area where 2D EPE is realized. 2D EPE may mean two-dimensionally expanding an exit pupil by outputting light in such a way that light travels through the waveguide 101 while spreading in a two-dimensional direction, wherein a part of the light is output due to out-coupling by the diffraction grating and another part thereof travels therethrough. Because 2D EPE is also known technology, a detailed description thereof is omitted. Also, 2D EPE may be realized through out-coupling by a translucent mirror, a holographic optical device, or the like as well as the diffraction grating.

The 2D EPE area 130 may be arranged adjacent to the input part 110 and the 1D EPE area 120 in the second direction (y direction). For example, the 2D EPE area 130 may be located adjacent to the 1D EPE area 120 in the second direction (y direction), which is a direction in which light is output from the 1D EPE area 120, and may be located adjacent to the input part 110 in the second direction (y direction). Thus, light that is output while 1D EPE is realized in the 1D EPE area 120 may be incident on the 2D EPE area 130. A gap area GA may be arranged between the 1D EPE area 120 and the 2D EPE area 130 and between the input part 110 and the 2D EPE area 130. In the gap area GA, only the waveguide 101 exists and a diffraction grating may not be formed.

Referring to FIG. 1C, a rhombus grating 135 may be arranged in the 2D EPE area 130. The rhombus grating 135 may include rhombus-shaped protrusions 132 and a space 134 between the protrusions 132. Also, the rhombus grating 135 may have a structure in which the rhombus-shaped protrusions 132 are arranged in a two-dimensional array shape in a first slope direction SD1 and a second slope direction SD2 and spaced apart from each other through the space 134. Here, the first slope direction SD1 and the second slope direction SD2 may be defined on the x-y plane, and thus the first slope direction SD1 and the second slope direction SD2 may be perpendicular to the third direction (z direction). Also, the first slope direction SD1 and the second slope direction SD2 may correspond to directions in which sides of a rhombus of a protrusion 132 extend. For example, as shown in FIG. 1D, the first slope direction SD1 may have a first angle θ1 in a clockwise direction with respect to the second direction (y direction), and the second slope direction SD2 may have a first angle θ1 in a counterclockwise direction with respect to the second direction (y direction). The first angle may be less than 45°. According to an embodiment, the first angle θ1 may be greater than 45°. When the first angle θ1 is greater than 45°, a rhombus may have a shape elongated in the first direction (x direction). A cross-sectional shape of the rhombus grating 135 is described in more detail with reference to FIGS. 3A and 3B.

As indicated by an arrow of FIG. 1D, light Ly may travel in the second direction (y direction) in the 2D EPE area 130, and light Ls may travel while spreading with a certain angle with respect to the second direction (y direction), for example, a second angle θ2. For example, the second angle θ2 may be greater than the first angle θ1 of the rhombus grating 135. The second angle θ2 may be variously changed according to a structure of the rhombus grating 135. Light may be output in the third direction (z direction) through out-coupling while 2D EPE is realized in the 2D EPE area 130. Here, the third direction (z direction) is a direction perpendicular to the first direction (x direction) and the second direction (y direction), that is, a direction perpendicular to a paper surface. Also, a direction of light output from the 2D EPE area 130 may be opposite to a direction of light input to the input part 110. However, according to an embodiment, the line grating 115 of the input part 110 and the rhombus grating 135 of the 2D EPE area 130 may be formed on opposite surfaces of the waveguide 101, and thus, the direction of light output from the 2D EPE area 130 and the direction of light input to the input part 110 may be identical to each other.

External light may be directly input to the 2D EPE area 130. Accordingly, light directly input from the outside and light input through the input part 110 may be combined in an output from the 2D EPE area 130. For reference, light or an image input through the input part 110 may correspond to virtual light or a virtual image, and light or an image directly input to the 2D EPE area 130 may correspond to real light or a real image. A combination of the virtual image and the real image is described in more detail with reference to FIG. 5. Based on a light coupling function in the 2D EPE area 130, the optical device for EPE 100 according to an embodiment may correspond to a coupler having an EPE structure. Also, the optical device for EPE 100 may be referred to as a coupler having a double EPE structure in which 1D EPE and 2D EPE are overlapped in the EPE part 150.

According to an embodiment, the EPE part 150 may include the 1D EPE area 120 and the 2D EPE area 130, and 1D EPE and 2D EPE may be overlapped in the EPE part 150. Thus, the optical device for EPE 100 may expand a field of view (FOV) based on 1D EPE and 2D EPE, improve luminance uniformity of an entire output image, and improve luminance change and FOV uniformity for each position of an eye in an eye box. In the optical device for EPE 100, FOV expansion, luminance uniformity improvement, and luminance change and FOV uniformity improvement for each position of the eye are described in more detail with reference to FIGS. 6A to 11C.

Figures 2B, 2C:
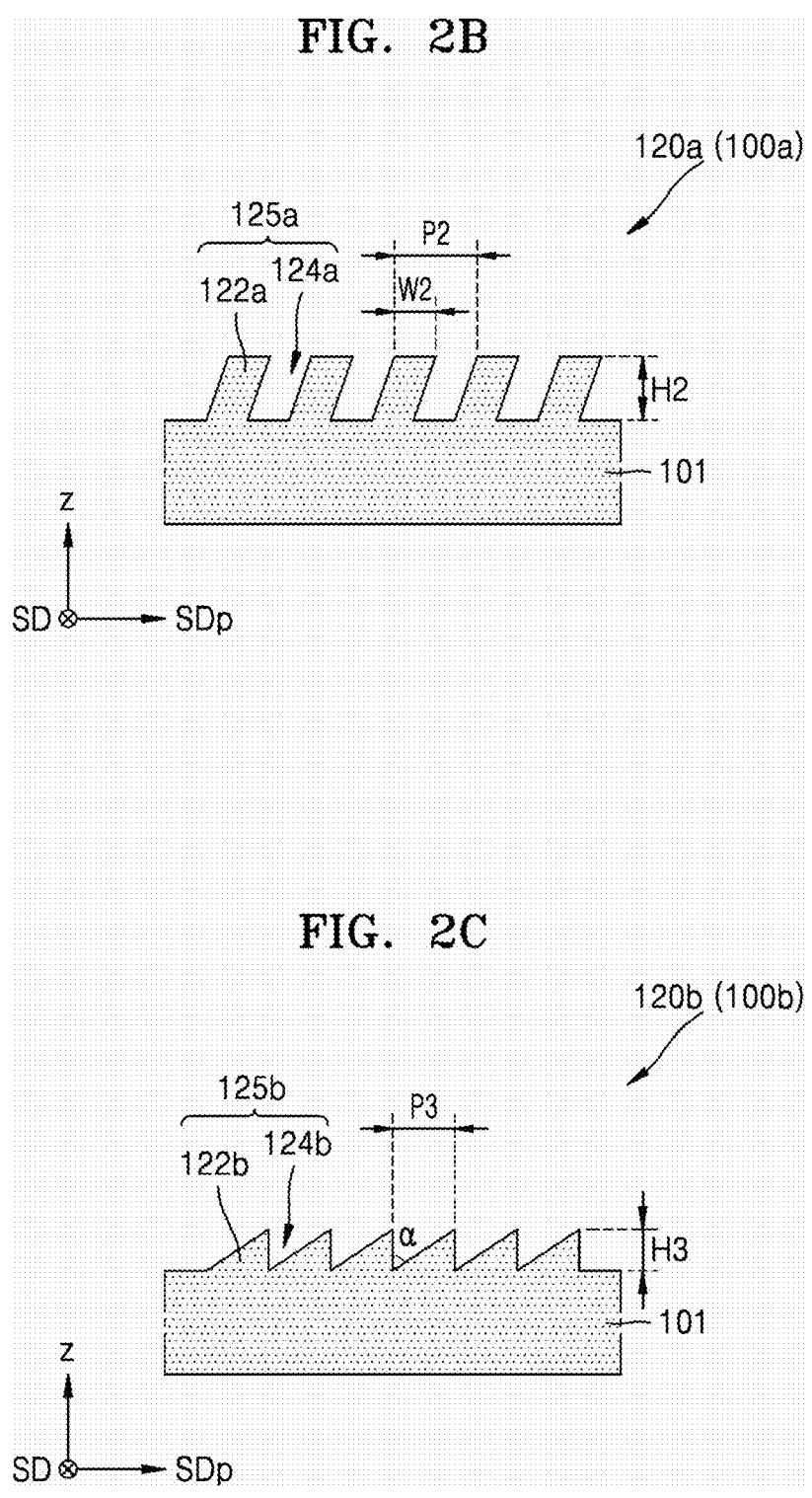
Figures 3A, 3B:
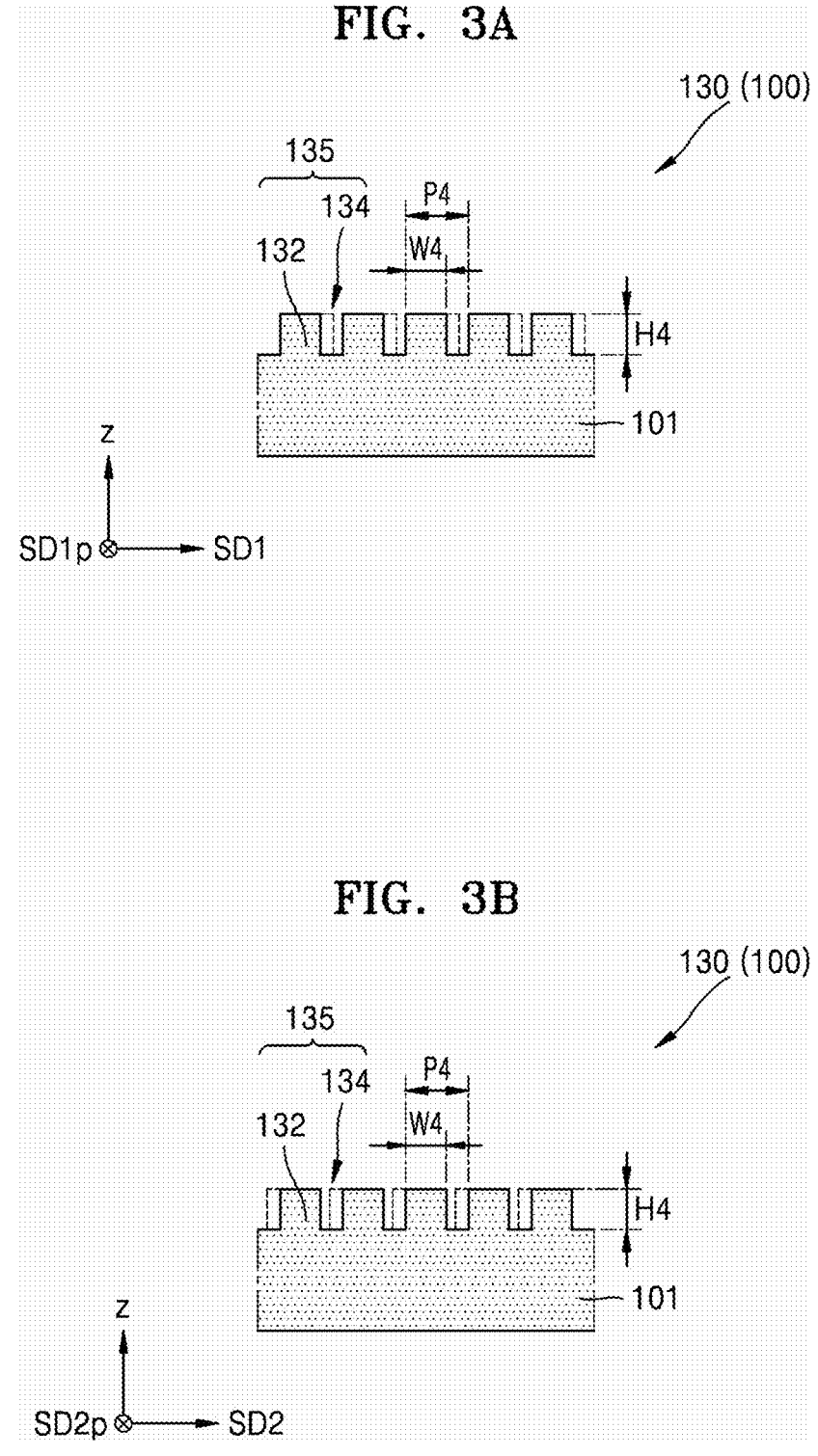
FIGS. 3A and 3B are cross-sectional views taken along lines II-II' and III-III' of FIG. 1C, respectively, according to an embodiment.

FIGS. 2A to 2C are cross-sectional views taken along portion I-I' of FIG. 1B, according to various embodiments, and FIGS. 3A and 3B are cross-sectional views taken along portions II-II' and III-III' of FIG. 1C, respectively. Descriptions that have been provided above with reference to FIGS. 1A to 1D may be briefly described or omitted.

Referring to FIG. 2A, the 1D EPE area 120 of the EPE part 150 may be embodied through the line grating 125 formed on a surface of the waveguide 101. The line grating 125 may include line-shaped protrusions 122 and the space 124 between the protrusions 122. Similar to the protrusion 122, the space 124 may have a line shape. As described above, the line grating 125 may extend in the slope direction SD having a slope of 45° with respect to the first direction (x direction), and the 1D EPE area 120 of FIG. 2A may correspond to a cross-section perpendicular to the slope direction SD. The vertical slope direction SDp may refer to a direction perpendicular to the slope direction SD. The slope direction SD and the vertical slope direction SDp may be defined on the x-y plane, and may be perpendicular to the third direction (z direction).

A grating pattern of the line grating 125 may serve as a diffraction grating to diffract incident light. That is, the line grating 125 may change a traveling direction of light by diffracting light incident at a specific angle to generate destructive interference and constructive interference according to a width and height of the protrusion 122, a pitch of the grating pattern, and the like. As shown in FIG. 2A, a cross-section of the protrusion 122 may have a rectangular shape, and the protrusion 122 may have a first width W1 in the vertical slope direction SDp and a first height H1 in the third direction (z direction). Also, the grating pattern of the line grating 125 may have a first pitch P1 in the vertical slope direction SDp. In the line grating 125, the first width W1 and the first height H1 of the protrusion 122 and the first pitch P1 of the grating pattern may be appropriately selected and formed according to a wavelength or intensity of light.

Referring to FIG. 2B, a 1D EPE area 120*a* of the EPE part 150 may be embodied through a line grating 125*a* formed on a surface of the waveguide 101. Similar to the line grating 125 of FIG. 2A, the line grating 125*a* may include line-shaped protrusions 122*a* and a space 124*a* between the protrusions 122*a*. Also, the line grating 125*a* may extend in the slope direction SD.

As shown in FIG. 2B, unlike the line grating 125 of FIG. 2A, the line grating 125*a* may include a protrusion 122*a* having a cross-section in a parallelogram shape. For example, the protrusion 122*a* may be slanted at a certain angle with respect to the waveguide 101. The protrusion 122*a* may have a second width W2 in the vertical slope direction SDp and a second height H2 in the third direction (z direction). Also, a grating pattern of the line grating 125*a* may have a second pitch P2 in the vertical slope direction SDp. Even in the line grating 125*a*, the second width W2 and the second height H2 of the protrusion 122*a* and the second pitch P2 of the grating pattern may be appropriately selected and formed according to a wavelength or intensity of light.

Referring to FIG. 2C, a 1D EPE area 120b of the EPE part 150 may be embodied through a line grating 125b formed on a surface of the waveguide 101. Similar to the line grating 125 of FIG. 2A, the line grating 125b may include line-shaped protrusions 122b and a space 124b between the protrusions 122b. Also, the line grating 125b may extend in the slope direction SD.

As shown in FIG. 2C, unlike the line grating 125 of FIG. 2A, the line grating 125b may include a protrusion 122b having a cross-section in a serrated shape. For example, a cross-section of the protrusion 122b may have a triangular shape. The protrusion 122b may have a third height H3 in the third direction (z direction). Also, a grating pattern of the line grating 125b may have a third pitch P3 in the vertical slope direction SDp. As the protrusion 122b has a serrated shape, the protrusion 122b may form an angle α with another protrusion 122b. In the line grating 125b, the angle α and the third height H3 of the protrusion 122b and the third pitch P3 of the grating pattern may be appropriately selected and formed according to a wavelength or intensity of light.

Referring to FIGS. 3A and 3B, the 2D EPE area 130 of the EPE part 150 may be embodied through the rhombus grating 135 formed on a surface of the waveguide 101. The rhombus grating 135 may include the rhombus-shaped protrusions 132 and the space 134 between the protrusions 132. The protrusions 132 may be arranged in the first slope direction SD1 and the second slope direction SD2 and spaced apart from each other through the space 134.

The 2D EPE area 130 of FIG. 3A may correspond to a cross-section perpendicular to a first vertical slope direction SD1p. The first vertical slope direction SD1p may be defined on the x-y plane, perpendicular to the first slope direction SD1, and perpendicular to the third direction (z direction). In the rhombus grating 135, a protrusion 132 may have a fourth width W4 in the first slope direction SD1 and a fourth height H4 in the third direction (z direction). Also, a grating pattern of the rhombus grating 135 may have a fourth pitch P4 in the first slope direction SD1.

The 2D EPE area 130 of FIG. 3B may correspond to a cross-section perpendicular to a second vertical slope direction SD2p. The second vertical slope direction SD2p may also be defined on the x-y plane, perpendicular to the second slope direction SD2, and perpendicular to the third direction (z direction). In the rhombus grating 135, the protrusion 132 may have the fourth width W4 in the second slope direction SD2 and the fourth height H4 in the third direction (z direction). Also, the grating pattern of the rhombus grating 135 may have the fourth pitch P4 in the second slope direction SD2. Because the protrusion 132 has a rhombus shape, a width of the protrusion 132 in the first slope direction SD1 and the second slope direction SD2 may be equal to the fourth width W4, and a pitch of the grating pattern may be equal to the fourth pitch P4. In the rhombus grating 135, the fourth width W4 and the fourth height H4 of the protrusion 132 and the fourth pitch P4 of the grating pattern may be appropriately selected and formed according to a wavelength or intensity of light.

In FIG. 3A, a dashed line may correspond to a side surface of the protrusion 132 that is visible when a cross-section of the 2D EPE area 130 is viewed in the first vertical slope direction SD1p. Also, a dashed line of FIG. 3B may also correspond to a side surface of the protrusion 132 that is visible when a cross-section of the 2D EPE area 130 is viewed in the second vertical slope direction SD2p.

Figures 4A, 4B:
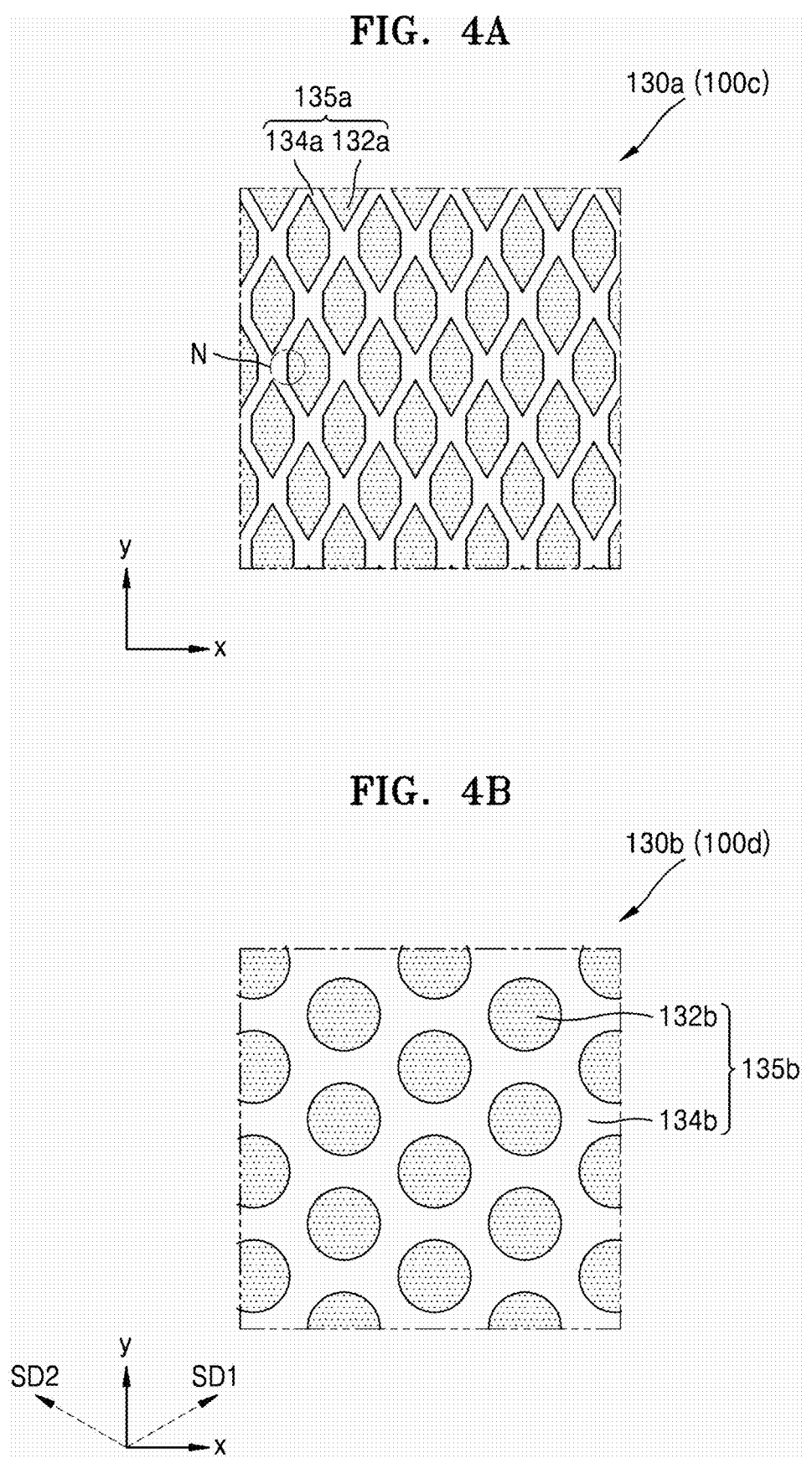
FIGS. 4A and 4B are enlarged plan views of a two-dimensional (2D) EPE area of the optical device for EPE of FIG. 1A, according to various embodiments.

FIGS. 4A and 4B are enlarged plan views of the 2D EPE area of the optical device for EPE of FIG. 1A, and may correspond to FIG. 1C. Descriptions that have already been given with reference to FIGS. 1A to 3B are briefly given or omitted.

Referring to FIG. 4A, according to an embodiment, a 2D EPE area 130a of the EPE part 150 may be embodied through a deformed rhombus grating 135a formed on a surface of the waveguide 101. Similar to the rhombus grating 135 of FIG. 1C, the deformed rhombus grating 135a may include protrusions 132a and a space 134a between the protrusions 132a. In the deformed rhombus grating 135a, a protrusion 132a may have a deformed rhombus shape in which a notch N is formed at both vertices of a rhombus in the first direction (x direction). In FIG. 4A, although a notch N is shown in the form of a straight line, the notch N is not limited thereto, and may have various shapes such as a semicircle, a V shape, and the like.

According to an embodiment, in the deformed rhombus grating 135a, a protrusion 132a may have a deformed rhombus shape in which a notch N is formed at both vertices of a rhombus in the second direction (y direction). Also, a protrusion 132a may have a deformed rhombus shape in which notches N are formed at all four vertices of a rhombus.

Referring to FIG. 4B, according to an embodiment, a 2D EPE area 130b of the EPE part 150 may be embodied through a circular grating 135b formed on a surface of the waveguide 101. The circular grating 135b may include circular protrusions 132b and a space 134b between the protrusions 132b. Also, the circular grating 135b may have a structure in which the circular protrusions 132b are arranged in a two-dimensional array shape in the first slope direction SD1 and the second slope direction SD2 and spaced apart from each other through the space 134b.

More specifically, the protrusions 132b may be arranged in the first slope direction SD1 and spaced apart from each other through the space 134b. Also, the protrusions 132b may be arranged in the second slope direction SD2 and spaced apart from each other through the space 134b. Here, the first slope direction SD1 and the second slope direction SD2 may be directions in which the protrusions 132b are arranged in a line. The first slope direction SD1 and the second slope direction SD2 may be substantially identical to the first slope direction SD1 and the second slope direction SD2 in the rhombus grating 135 of FIG. 1C. That is, the protrusions 132 of the rhombus grating 135 of FIG. 1C may also be arranged in each of the first slope direction SD1 and the second slope direction SD2 and spaced apart from each other through the space 134.

Hereinabove, although some shapes of the diffraction grating of the 2D EPE area are provided as examples, a shape of the diffraction grating formed in the 2D EPE area is not limited to the above-described shapes. For example, in the optical device for EPE, various shapes of diffraction gratings may be formed in the 2D EPE area, and light may spread two-dimensionally in the waveguide 101 and may be output to the outside while 2D EPE is achieved through a diffraction grating. Also, in the optical device for EPE, a width and a height of a protrusion of the diffraction grating of the 2D EPE area and a pitch of a grating pattern may be appropriately selected and formed according to a wavelength or intensity of light.

Figures 5, 6A:
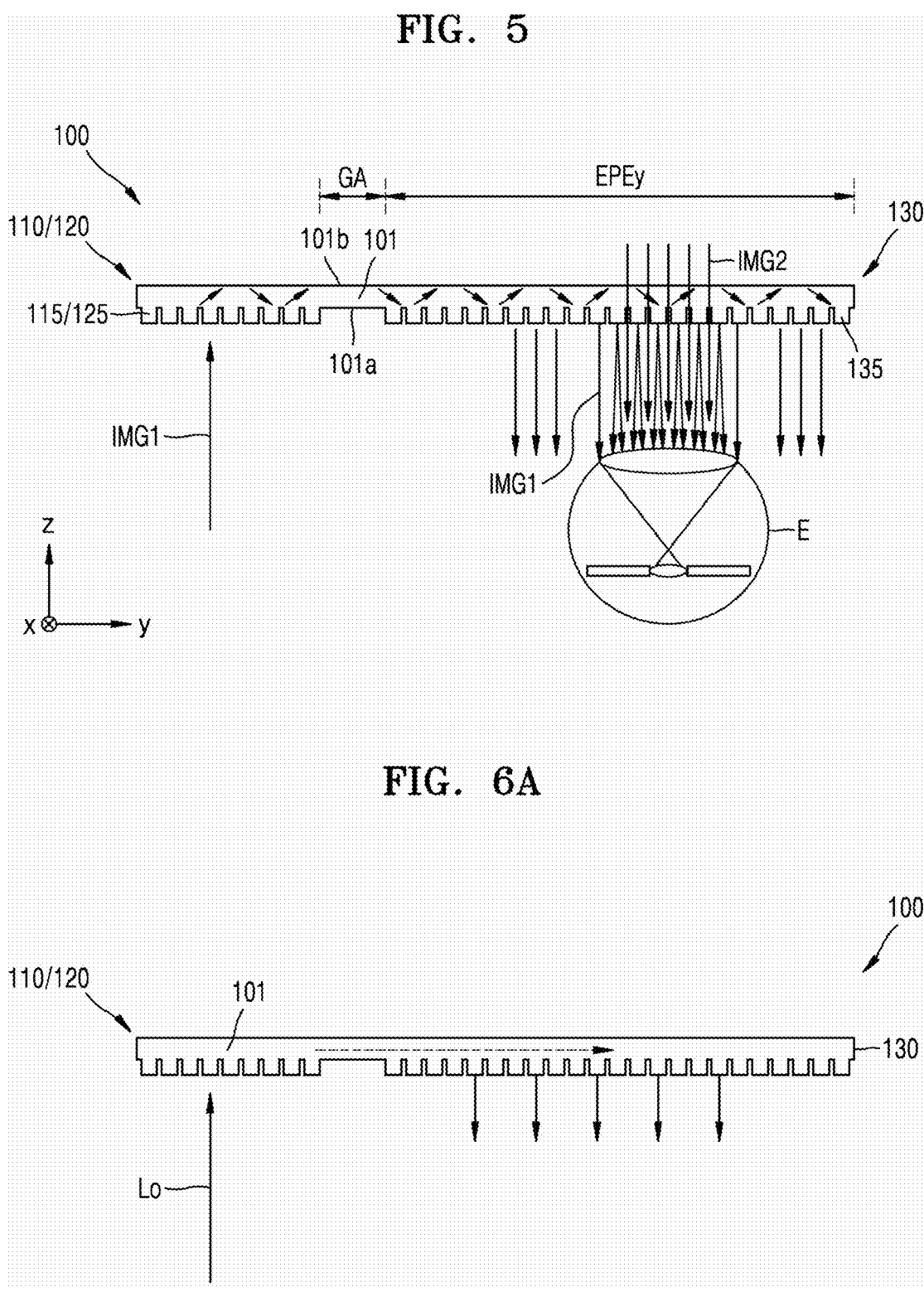
FIG. 5 is a conceptual view for explaining an operation of the optical device for EPE of FIG. 1A, according to an embodiment.
FIG. 6A is a conceptual view of a traveling direction of vertically incident light in the optical device for EPE.

FIG. 5 is a conceptual view for explaining an operation of the optical device for the EPE of FIG. 1A. Descriptions that have been provided with reference to FIGS. 1A to 4B may be briefly given or omitted.

Referring to FIG. 5, in the optical device for EPE 100, a virtual image IMG1 from an image generator 200 (see FIG. 12) may be input to the input part 110 in the third direction (z direction). The virtual image IMG1 may be bent in the first direction (x direction) through in-coupling by a line-shaped diffraction grating of the input part 110, that is, the line grating 115, to enter the 1D EPE area 120. The 1D EPE area 120 may be arranged on both sides of the input part 110 in the first direction (x direction). For reference, as FIG. 5 is shown in a cross-sectional shape, the 1D EPE area 120 is not shown to be distinct from the input part 110, but is indicated only with reference numerals "110/120". Also, the line grating 115/125 is simplified and conceptually expressed, and a shape and extension direction of the line grating 115/125 may be different from a shape and extension direction of an actual line grating 115/125.

The virtual image IMG1 that has entered the 1D EPE area 120 may be output in the second direction (y direction) through out-coupling while 1D EPE is realized by the line grating 125 of the 1D EPE area 120 to enter the 2D EPE area 130, as shown by fine arrows. The 2D EPE area 130 may have a flat shape extending in the first direction (x direction) and the second direction (y direction). The rhombus grating 135 may be formed in the 2D EPE area 130. As FIG. 5 is shown in a cross-sectional shape, the 2D EPE area 130 may be shown in a shape extending only in the second direction (y direction). Also, the rhombus grating 135 is simplified and conceptually expressed, and a shape and extension direction of the rhombus grating 135 may be different from a shape and extension direction of an actual rhombus grating 135.

The virtual image IMG1 that has entered the 2D EPE area 130 may be output in the third direction (z direction) through out-coupling while 2D EPE is realized by the rhombus grating 135 of the 2D EPE area 130, as shown by fine arrows. As shown in FIG. 5, when an eye E of an observer (or a user) is located in a lower portion in the third direction (z direction), the virtual image IMG1 may be output from the 2D EPE area 130 and provided to the eye E of the observer. Also, the virtual image IMG1 may be output while 2D EPE is realized in the 2D EPE area 130. Accordingly, as long as the eye E of the observer is located within a width of 2D EPE, the observer may see the entire virtual image IMG1. Due to the cross-sectional shape of FIG. 5, only a width EPEy of EPE in the second direction (y direction) is indicated.

The rhombus grating 135 of the 2D EPE area 130 acts as a diffraction grating only with respect to light incident obliquely to a surface and transmits light incident vertically thereto. Thus, as shown in FIG. 5, a real image IMG2 incident onto the 2D EPE area 130 from an upper portion in the third direction (z direction) may pass through the rhombus grating 135 and may be provided to the eye E of the observer. As a result, a combined image of the virtual image IMG1 and the real image IMG2 is provided to the eye E of the observer, and the observer may see the combined image. Thus, the optical device for the EPE 100 according to an embodiment corresponds to a coupler having a waveguide-type EPE structure, and may be used in an augmented reality (AR) or mixed reality (MR) device.

Figure 6B:
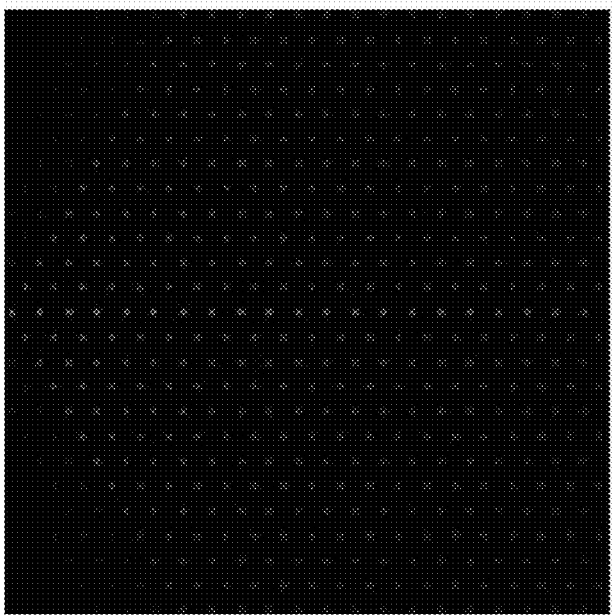
FIGS. 6B and 6C are simulation images showing a comparison of luminance uniformity of emitted light with respect to vertically incident light in an optical device for EPE of the related art and the optical device for EPE according to an embodiment.
Figure 6C:
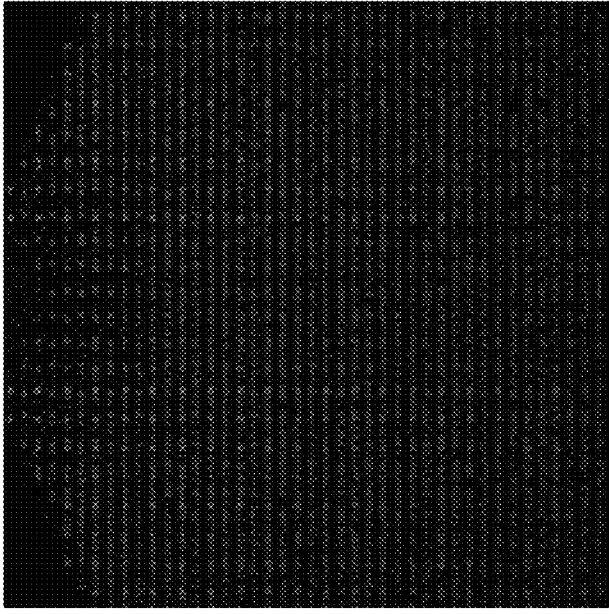

FIG. 6A is a conceptual view of a traveling direction of vertically incident light in the optical device for EPE, and FIGS. 6B and 6C are simulation images showing a comparison of luminance uniformity of emitted light with respect to vertically incident light in an optical device for EPE of the related art and the optical device for EPE of the one or more embodiments, wherein FIG. 6B relates to an optical device for EPE of the related art, and FIG. 6C relates to the optical device for EPE according to the one or more embodiments.

Referring to FIG. 6A, in the optical device for EPE 100 according to an embodiment, vertically incident light Lo is incident upon the input part 110, and may be output to the outside through out-coupling while EPE is realized through the 1D EPE area 120 and the 2D EPE area 130 of the EPE part 150. The 1D EPE is realized in the 1D EPE area 120 and the 2D EPE is realized in the 2D EPE area 130, such that in the optical device for EPE 100 of the present embodiment, a duplicate EPE may be realized in the EPE part 150.

In the case of the optical device for EPE of the related art, only 2D EPE may be realized. In such optical device for EPE of the related art, a structure of a 1D EPE area+a 1D EPE area is formed in an EPE part to realize 1D EPE in the first direction (x direction) and the second direction (y direction) sequentially, or a structure of a 2D EPE area is formed in the EPE part to realize EPE in the first direction and the second direction at the same time. Even in the optical device for EPE of the related art, vertically incident light is incident upon an input part and may be output to the outside through out-coupling while 2D EPE is realized in the EPE part.

Referring to FIG. 6B, in the case of the optical device for EPE of the related art, emitted light may be two-dimensionally output while 2D EPE is realized, and distances between the emitted light may be far apart and luminance of the emitted light may be low. Also, luminance of the output light of an outer area may be lower than luminance of the output light at a central line portion. Accordingly, it may be seen that luminance uniformity of the entire output light is low in the optical device for EPE of the related art.

In contrast, referring to FIG. 6C, in the case of the optical device for EPE 100 according to the one or more embodiments of the disclosure, emitted light is output two-dimensionally, distances between the emitted light may be close together, and luminance may be high. Also, in both a central area and an outer area, luminance of the output light may be high and substantially uniform. Thus, it may be seen that luminance uniformity of the entire output light is high in the optical device for EPE 100 according to the one or more embodiments.

Figure 7A:
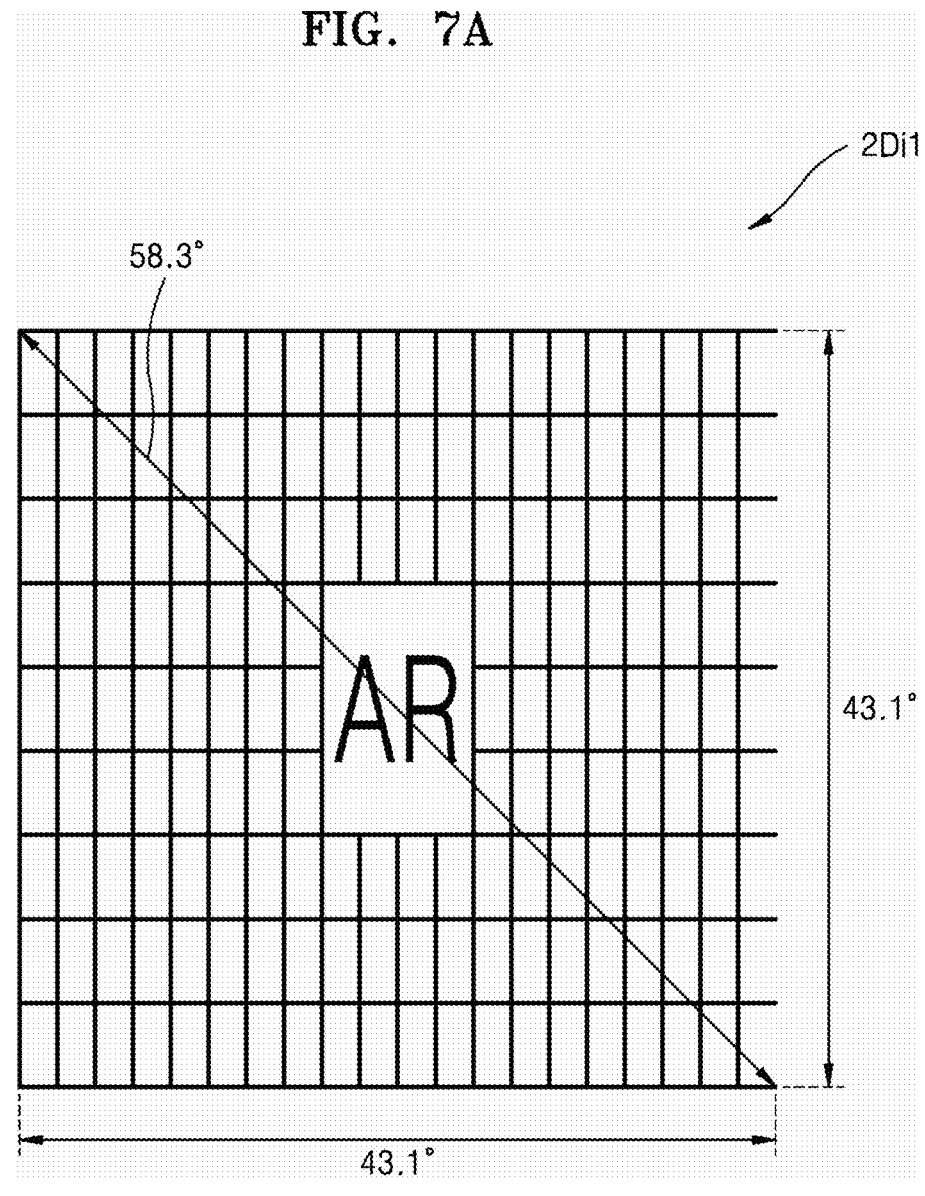
FIGS. 7A and 7B are conceptual views of 2D input images and FIG. 7C is a view angle of a 2D input image in the optical device for EPE according to an embodiment.
Figures 7B, 7C:
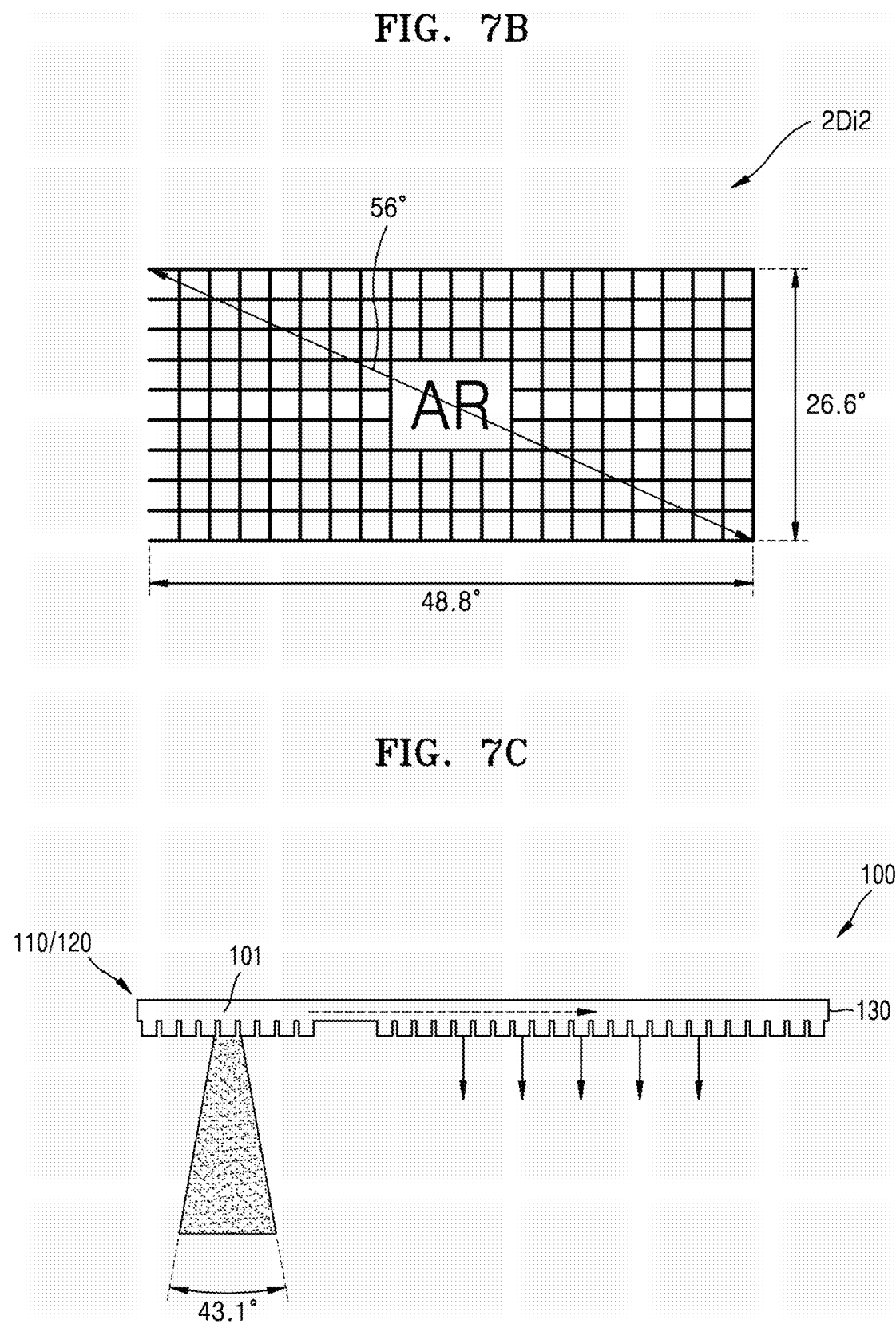

FIGS. 7A and 7B are 2D input images and FIG. 7C is a conceptual view of a view angle of a 2D input image in the optical device for EPE according to an embodiment.

Referring to FIGS. 7A to 7C, a 2D input image 2Di1 of FIG. 7A may have a square shape, and in terms of an angle of view, may have vertical and horizontal angles of view of about 43.1° and a diagonal angle of view of about 58.3°. Here, the angle of view may refer to a field of view of a scene captured by a camera or seen by an observer's eye. In FIG. 7C, a form in which the 2D input image 2Di1 of FIG. 7A is incident upon the input part 110 of the optical device for EPE 100 is shown in terms of an angle of view. A 2D input image 2Di2 of FIG. 7B may have a rectangular shape, and in terms of an angle of view, may have a vertical angle of view of about 26.6°, a horizontal angle of view of about 48.8°, and a diagonal angle of view of about 56°.

Figure 8A:
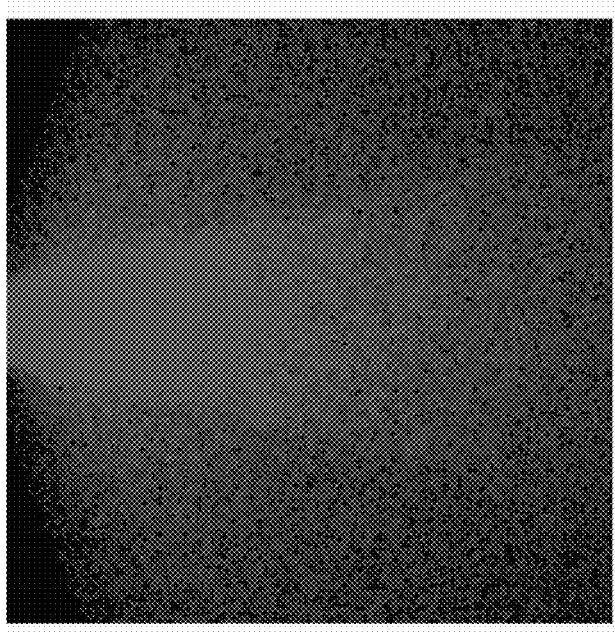
FIGS. 8A and 8B are simulation pictures showing a comparison of luminance uniformity of an output image with respect to a 2D input image in an optical device for EPE of the related art and the optical device for EPE according to an embodiment.
Figure 8B:
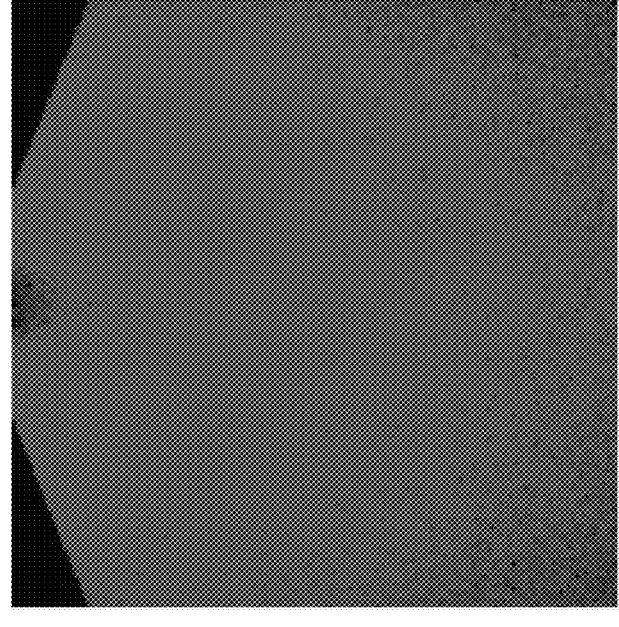

For reference, the 2D input image 2Di1 of FIG. 7A may be used for comparison of luminance uniformity in FIGS. 8A and 8B, and the 2D input image 2Di2 of FIG. 7B may be used for comparison of a luminance change and FOV uniformity according to a position of an eye in an eye box in FIGS. 9A to 11C. The 2D input image 2Di1 of FIG. 7A and the 2D input image 2Di2 of FIG. 7B may each correspond to a virtual image.

FIGS. 8A and 8B are simulation images showing a comparison of luminance uniformity of an output image with respect to a 2D input image in an optical device for EPE of the related art and the optical device for EPE of the one or more embodiments, respectively. FIG. 8A relates to the optical device for EPE of the related art, and FIG. 8B relates to the optical device for EPE of the one or more embodiments. However, the optical device for EPE of the related art is the same as that described with reference to FIGS. 6A to 6C.

Referring to FIGS. 8A and 8B, as shown in FIG. 8A, in the optical device for EPE of the related art, a 2D output image with respect to the 2D input image 2Di1 of FIG. 7A may have high luminance in a central area and low luminance in an outer area. Thus, it may be seen that luminance uniformity of the entire 2D output image is low in the optical device for EPE of the related art.

In contrast, as shown in FIG. 8B, in the optical device for EPE 100 of the one or more embodiments, a 2D output image with respect to the 2D input image 2Di1 of FIG. 7A may have high luminance in both a central area and an outer area. Also, the 2D output image may appear almost similarly in the central area and the outer area except for outermost portions. Thus, it may be seen that luminance uniformity of the entire 2D output image is high in the optical device for EPE 100 of the one or more embodiments.

It may be seen that the optical device for EPE 100 of the one or more embodiments may perform eye box expansion and FOV expansion and has higher luminance and uniformity compared to the optical device for EPE of the related art. That is, the eye box expansion and the FOV expansion according to the one or more embodiments may yield high luminance and luminance uniformity of the output light with respect to the vertically incident light in FIG. 6C and high luminance and luminance uniformity of the 2D output image with respect to the 2D input image in FIG. 8B. Here, an eye box is an area where an entire image may be seen when an observer's eye is located in the eye box, and is substantially the same concept as an exit pupil, and the eye box may be expanded through EPE.

Figure 9A:
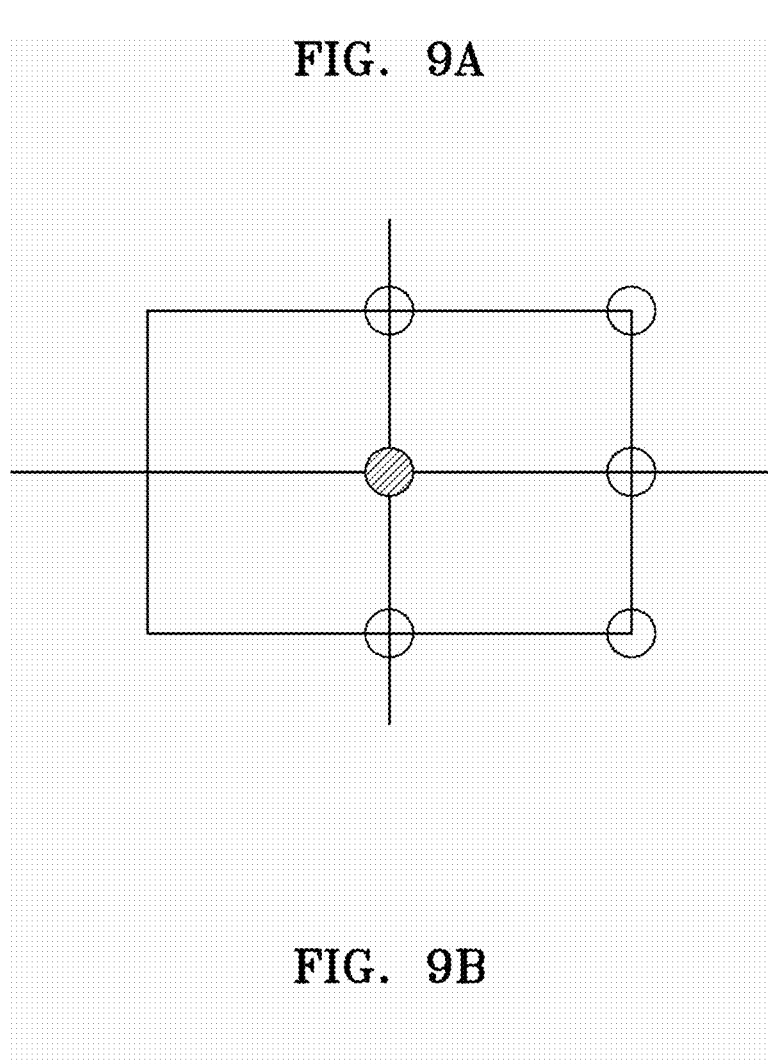
FIGS. 9A to 11C are conceptual views of positions of an eye in an eye box, and are pictures showing a comparison of a luminance change and field of view (FOV) uniformity in an optical device for EPE of the related art and the optical device for EPE according to an embodiment.
Figure 9B:
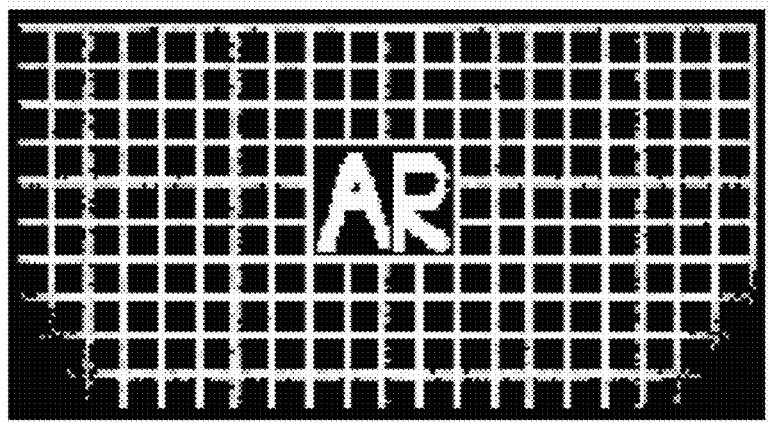
Figure 9C:
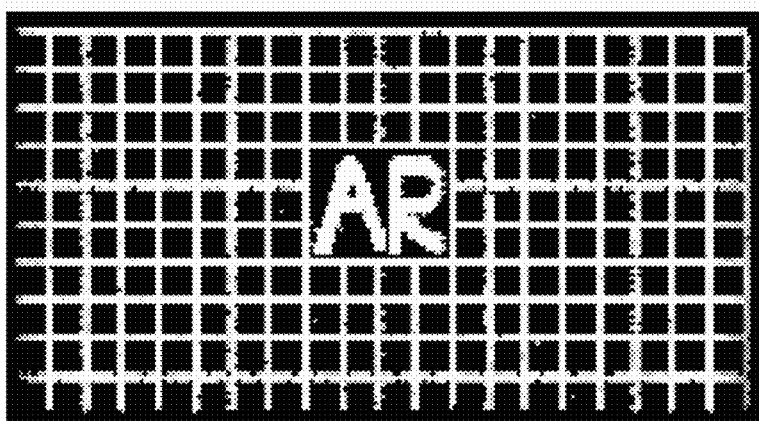
Figure 10A:
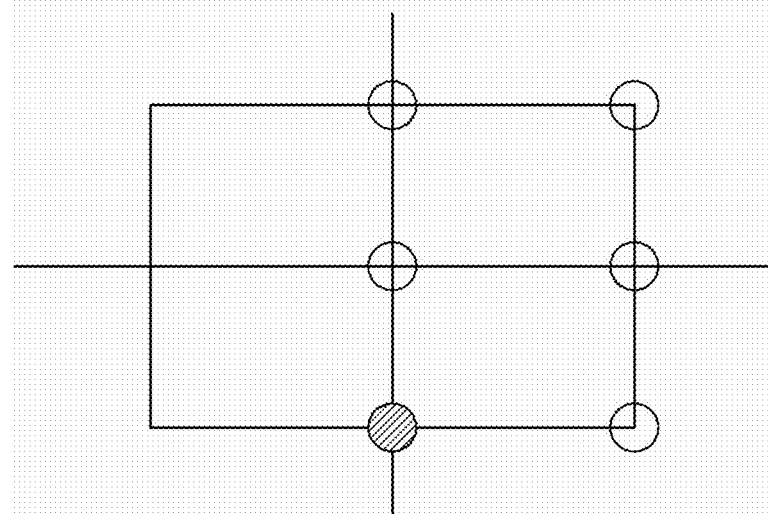
Figure 10B:
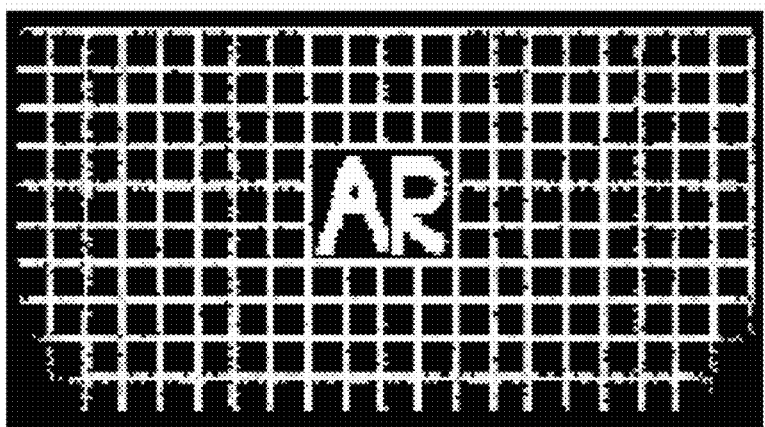
Figure 10C:
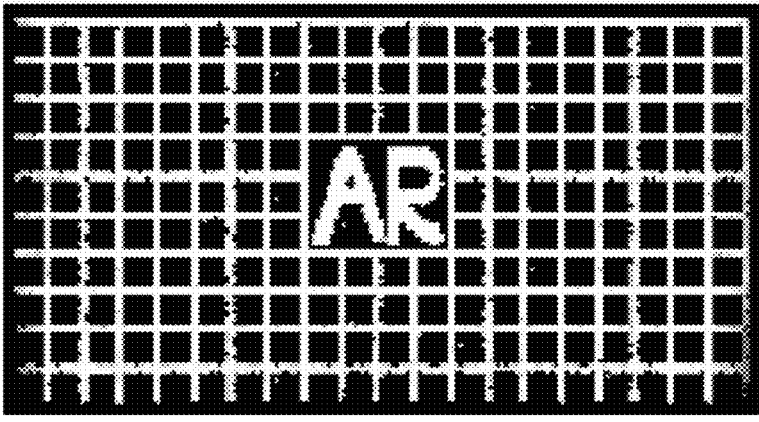
Figure 11A:
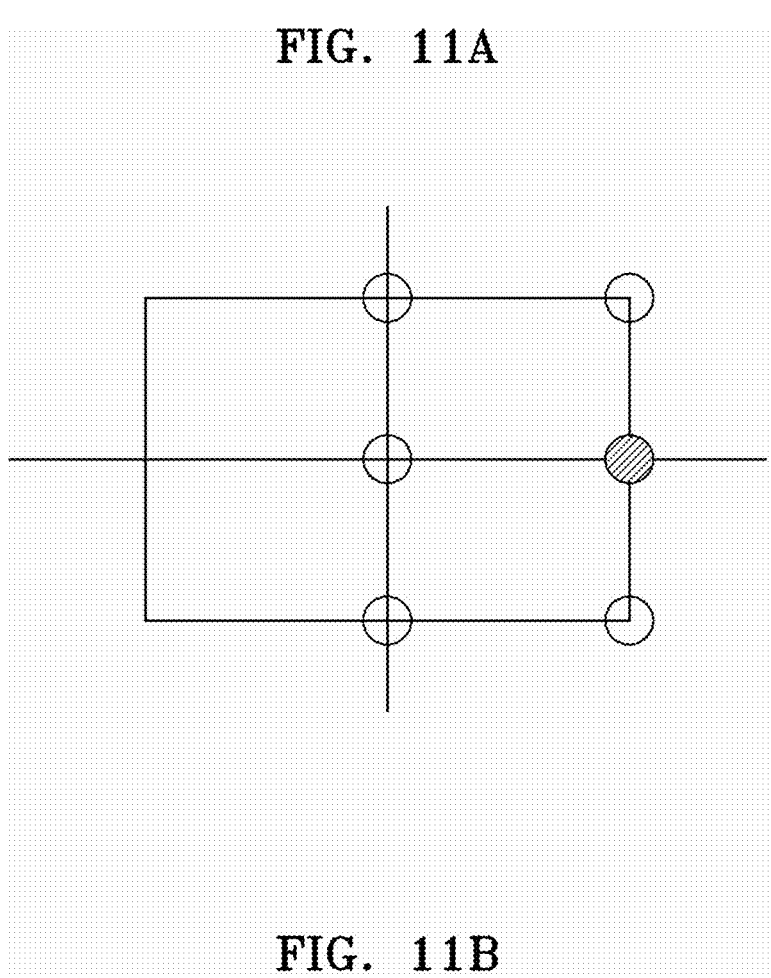
Figure 11B:
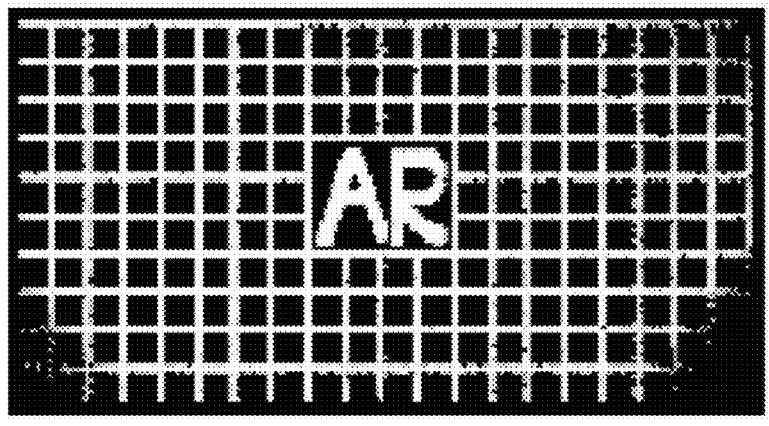
Figure 11C:
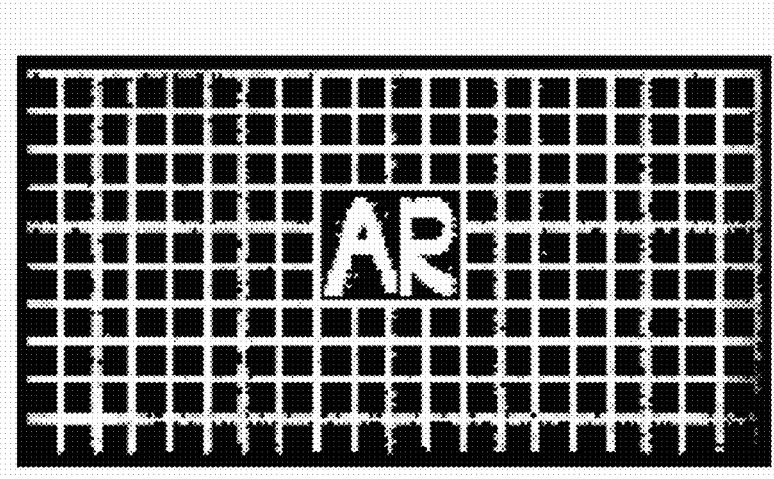

FIGS. 9A to 11C are conceptual views of positions of an eye in an eye box, and are images showing a comparison of a luminance change and FOV uniformity in an optical device for EPE of the related art and the optical device for EPE of the one or more embodiments, corresponding to each of the positions of the eye. Here, FIGS. 9A, 10A, and 11A show eyes at different positions in the eye box, FIGS. 9B, 10B, and 11B show a luminance change and FOV uniformity in the optical device for EPE of the related art in response to each eye position, and FIGS. 9C, 10C, and 11C show a luminance change and FOV uniformity in the optical device for EPE of the one or more embodiments with respect to each eye position. The optical device for EPE of the related art is the same as that described with reference to FIGS. 6A to 6C.

Referring to FIG. 9A, a rectangle may correspond to the eye box, and small circles may correspond to eye positions. In FIG. 9A, a central small circle among the small circles is hatched, which may mean that an eye is located in the center of the eye box. As shown in FIG. 9B, even when the eye is in the center of the eye box, lower corner sides of a 2D output image is partially cut and may not be visible in the optical device for EPE of the related art. In other words, it may be seen that an FOV of the optical device for EPE of the related art is small. Also, in the case of the optical device for EPE of the related art, luminance is low adjacent to a cut portion.

In contrast, as shown in FIG. 9C, when the eye is in the center of the eye box, an entire 2D output image is clear in the optical device for EPE 100 of the one or more embodiments. Thus, it may be seen that an FOV of the optical device for EPE 100 of the one or more embodiments is large. Also, in the case of the optical device for EPE 100, luminance of the entire 2D output image is high.

Referring to FIGS. 10A to 10C, in FIG. 10A, as a small circle in the lower center among small circles is hatched, it may be seen that an eye is located in the lower center of the eye box. As shown in FIG. 10B, when the eye is in the lower center of the eye box, because lower corner sides of a 2D output image is partially cut and are not visible in the optical device for EPE of the related art, it may be seen that an FOV of the optical device for EPE of the related art is small. Also, in the case of the optical device for EPE of the related art, luminance is low in an outer portion as well as a portion adjacent to a cut portion.

In contrast, as shown in FIG. 10C, even when the eye is in the lower center of the eye box, an entire 2D output image is clear in the optical device for EPE 100 of the one or more embodiments. Thus, it may be seen that an FOV of the optical device for EPE 100 of the one or more embodiments is large. Also, in the case of the optical device for EPE 100, luminance of the entire 2D output image is high.

Referring to FIG. 11A, as a small circle at the right of the center among small circles is hatched, it may be seen that an eye is located at the right of the center of the eye box. As shown in FIG. 11B, when the eye is at the right of the center of the eye box, because lower corner sides of a 2D output image is partially cut and are not visible in the optical device for EPE of the related art, it may be seen that an FOV of the optical device for EPE of the related art is small. Also, in the case of the optical device for EPE of the related art, luminance is also low in a right upper outer portion as well as a portion adjacent to a cut portion.

In contrast, as shown in FIG. 11C, even when the eye is at the right of the center of the eye box, an entire 2D output image is clear in the optical device for EPE 100 of the one or more embodiments. Thus, it may be seen that an FOV of the optical device for EPE 100 of the one or more embodiments is large. Also, in the case of the optical device for EPE 100, luminance of the entire 2D output image is high.

When comparing luminance for each position of the eye in the eye box, it may be seen that, in the case of the optical device for EPE of the related art, luminance in the outer portion of the 2D output image varies according to a position of the eye in the eye box. In contrast, in the case of the optical device for EPE 100 of the one or more embodiments, regardless of positions of the eye in the eye box, luminance of the entire 2D output image is high. Thus, it may be seen that, in the case of the optical device for EPE 100 of the one or more embodiments, there is little change in luminance according to the positions of the eye in the eye box.

Also, when comparing FOVs for each position of the eye in the eye box, in other words, when comparing sizes of the cut portions of the 2D output image, it may be seen that, in the optical device for EPE of the related art, when the eye is located at the right of the center of the eye box, a size of the cut portion is largest, and when the eye is located below the center of the eye box, a size of the cut portion is relatively small. Thus, it may be seen that, in the case of the optical device for EPE of the related art, FOV uniformity according to positions of the eye in the eye box is low. In contrast, in the optical device for EPE 100 of the one or more embodiments, regardless of positions of the eye in the eye box, the entire 2D output image is clear. Thus, it may be seen that, in the case of the optical device for EPE 100 of the one or more embodiments, FOV uniformity according to positions of the eye in the eye box is high.

Figure 12:
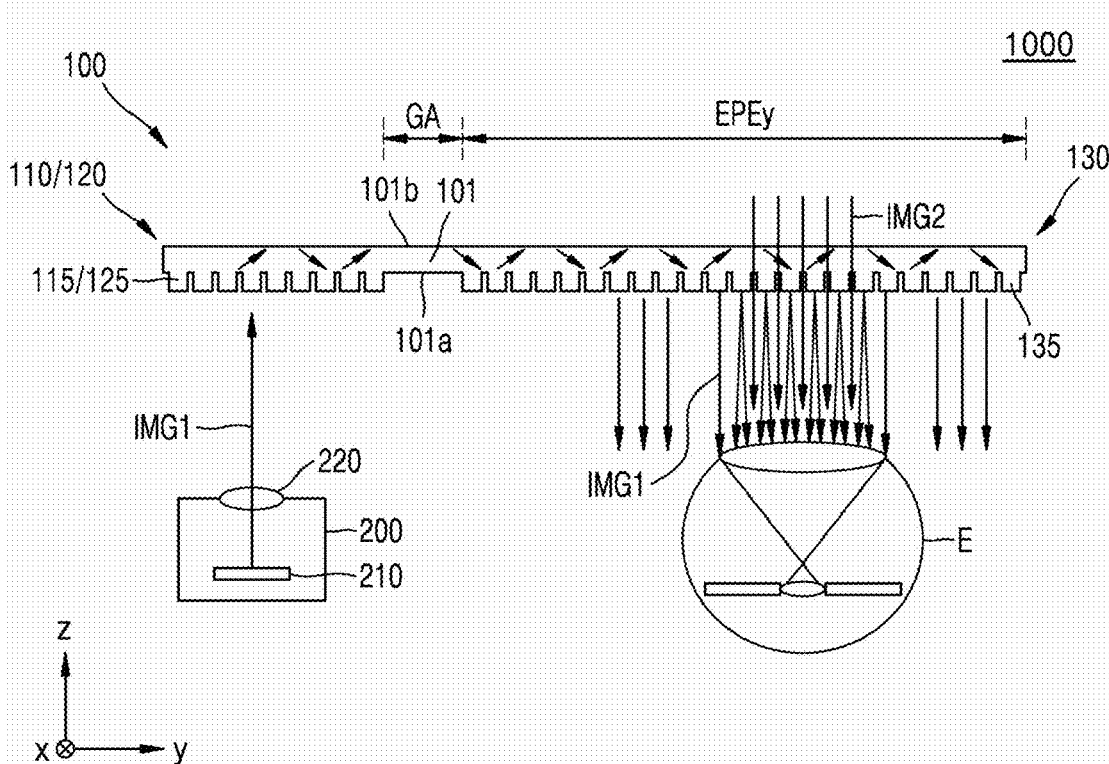
FIGS. 12 and 13 are conceptual views of a display apparatus including an optical device for EPE, according to an embodiment.
Figure 13:
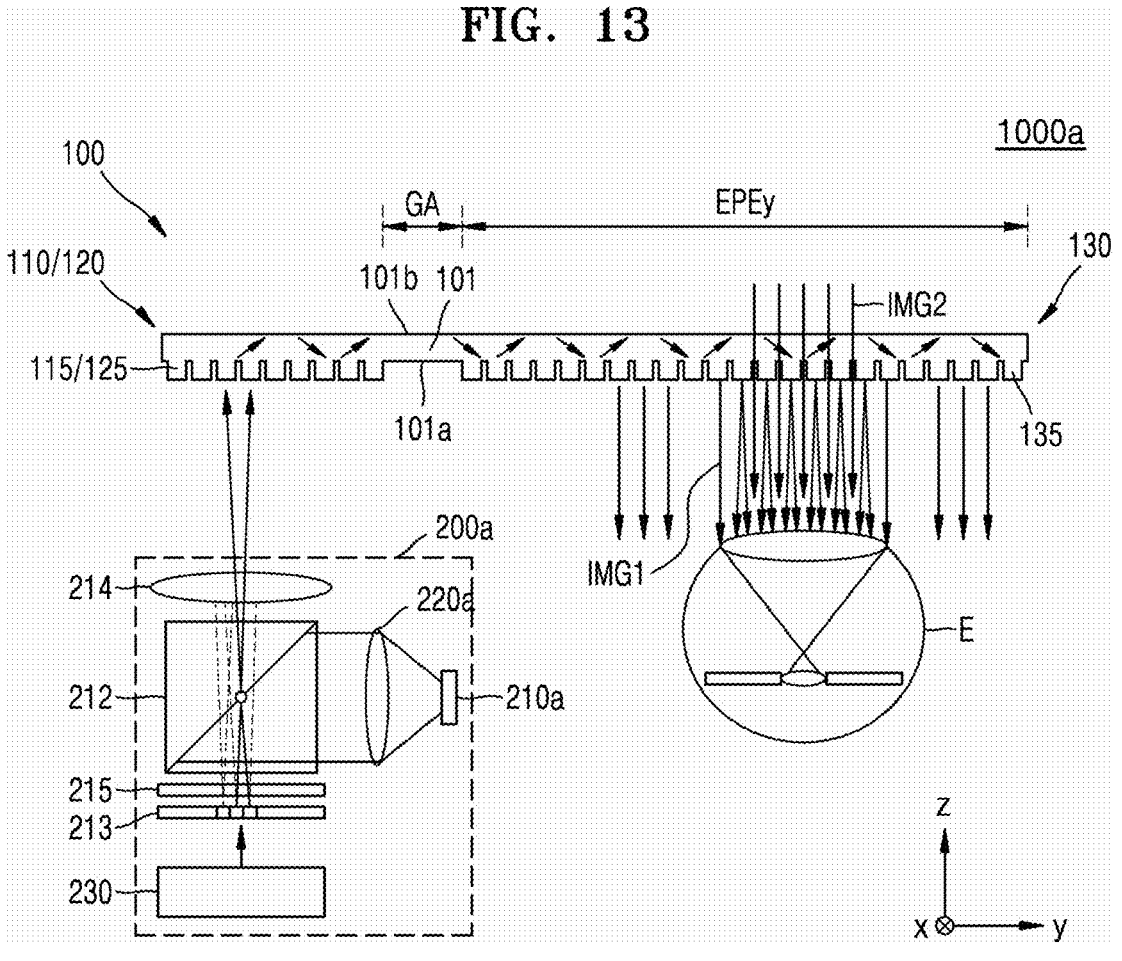

FIGS. 12 and 13 are conceptual views of a display apparatus including an optical device for EPE, according to various embodiments. Descriptions that have been provided with reference to FIGS. 1A to 5 may be briefly given and omitted.

Referring to FIG. 12, a display apparatus 1000 (hereinafter, simply referred to as a "display apparatus") may include an optical device for EPE 100 and an image generator 200. The optical device for EPE 100 may be the optical device for EPE 100 of FIG. 1A. However, the optical device for EPE 100 is not limited thereto. For example, the optical device for EPE 100a, 100b, 100c, and 100d of FIGS. 2B, 2C, 4A, and 4B may be implemented in the display apparatus 1000.

The image generator 200 may generate a virtual image and input the virtual image to an input part 110 of the optical device for EPE 100. The image generator 200 may include a micro-display 210 and a collimating lens 220. The virtual image of the micro-display 210 may be a 2D virtual image. The virtual image of the micro-display 210 may be output for each of pixels. Light output from the pixels of the micro-display 210 may be deformed into parallel light by the collimating lens 220 and incident onto the input part 110 of the optical device for EPE 100.

Referring to FIG. 13, a display apparatus 1000a may differ from the display apparatus 1000 of FIG. 12 in that the display apparatus 1000a includes a holographic image generator 200a instead of the general image generator 200. Specifically, the display apparatus 1000a of the present embodiment may include an optical device for EPE 100 and the holographic image generator 200a. The optical device for EPE 100 may be the optical device for EPE 100 of FIG. 1A. However, the optical device for EPE 100 is not limited thereto.

The holographic image generator 200a may include a light source 210a, a collimating lens 220a, a beam splitter 212, a spatial optical modulator 213, a lens 214, a polarizing plate 215, and an image processor 230.

The light source 210a may generate and output light. The light source 210a may output coherent light that may be diffracted by the spatial optical modulator 213 and subjected to interference. For example, the light source 210a may be a laser diode (LD) or a light-emitting diode (LED). However, a type of the light source 210a is not limited to an LD or an LED. For example, any type of light sources that output light having spatial coherence may be used as the light source 210a of the holographic image generator 200a.

Light of the light source 210a may be deformed into parallel light by the collimating lens 220a and input to the beam splitter 212. The beam splitter 212 may reflect the light from the light source 210a and transmit the light to the spatial optical modulator 213, and may transmit the light from the spatial optical modulator 213 to the lens 214. The beam splitter 212 may be a trans-reflective mirror that reflects half of incident light and transmits the other half, or may be a polarizing beam splitter with polarization selectivity. The polarizing plate 215 may be arranged between the beam splitter 212 and the spatial optical modulator 213. The polarizing plate 215 may be, for example, a ¼ wave plate.

According to an embodiment, the polarizing plate 215 may be integrally coupled to a surface of the spatial optical modulator 213.

The spatial optical modulator 213 may display a hologram pattern according to a hologram data signal provided from the image processor 230, for example, a computer generated hologram (CGH) signal. Light output from the light source 210a and incident onto the spatial optical modulator 213 is diffracted by the hologram pattern displayed on a screen of the spatial optical modulator 213, and then may be reproduced as a holographic image having a three-dimensional effect by destructive interference and constructive interference. For the spatial optical modulator 213, for example, one of a phase modulator capable of performing only phase modulation, an amplitude modulator capable of performing only amplitude modulation, and a complex modulator capable of performing both phase modulation and amplitude modulation may be used. In the display apparatus 1000a, the spatial optical modulator 213 may be a reflective spatial optical modulator that diffracts and modulates incident light while reflecting the incident light. For example, the spatial optical modulator 213 may include a liquid crystal on silicon (LCOS), a digital micro-mirror device (DMD), or a semiconductor modulator.

The image processor 230 may generate a CGH signal based on source image data including information about a holographic image to be reproduced and provide the CGH signal to the spatial optical modulator 213. For example, the image processor 230 may generate the CGH signal by performing, on the source image data, a Fourier transform, and an inverse Fourier transform (IFT), or a fast Fourier transform (FFT), and an inverse fast Fourier transform (IFFT).

The lens 214 may focus a holographic image and input the holographic image to the input part 110 of the optical device for EPE 100. A distance between the lens 214 and the input part 110 may be substantially equal to a focal length of the lens 214. However, the distance between the lens 214 and the input part 110 is not limited thereto. For example, when the distance between the lens 214 and the input part 110 is equal to the focal length of the lens 214, a holographic image by the spatial optical modulator 213 may be maximally incident upon the input part 110 at various angles.

A distance between the lens 214 and the spatial optical modulator 213 may be substantially equal to a focal length of the lens 214. However, the distance between the lens 214 and the spatial optical modulator 213 is not limited thereto. For example, when the distance between the lens 214 and the spatial optical modulator 213 is equal to the focal length of the lens 214, a holographic image reproduced on the spatial optical modulator 213 may be transmitted as it is to an eye E of an observer without degradation of image quality.

Figures 14A, 14B:
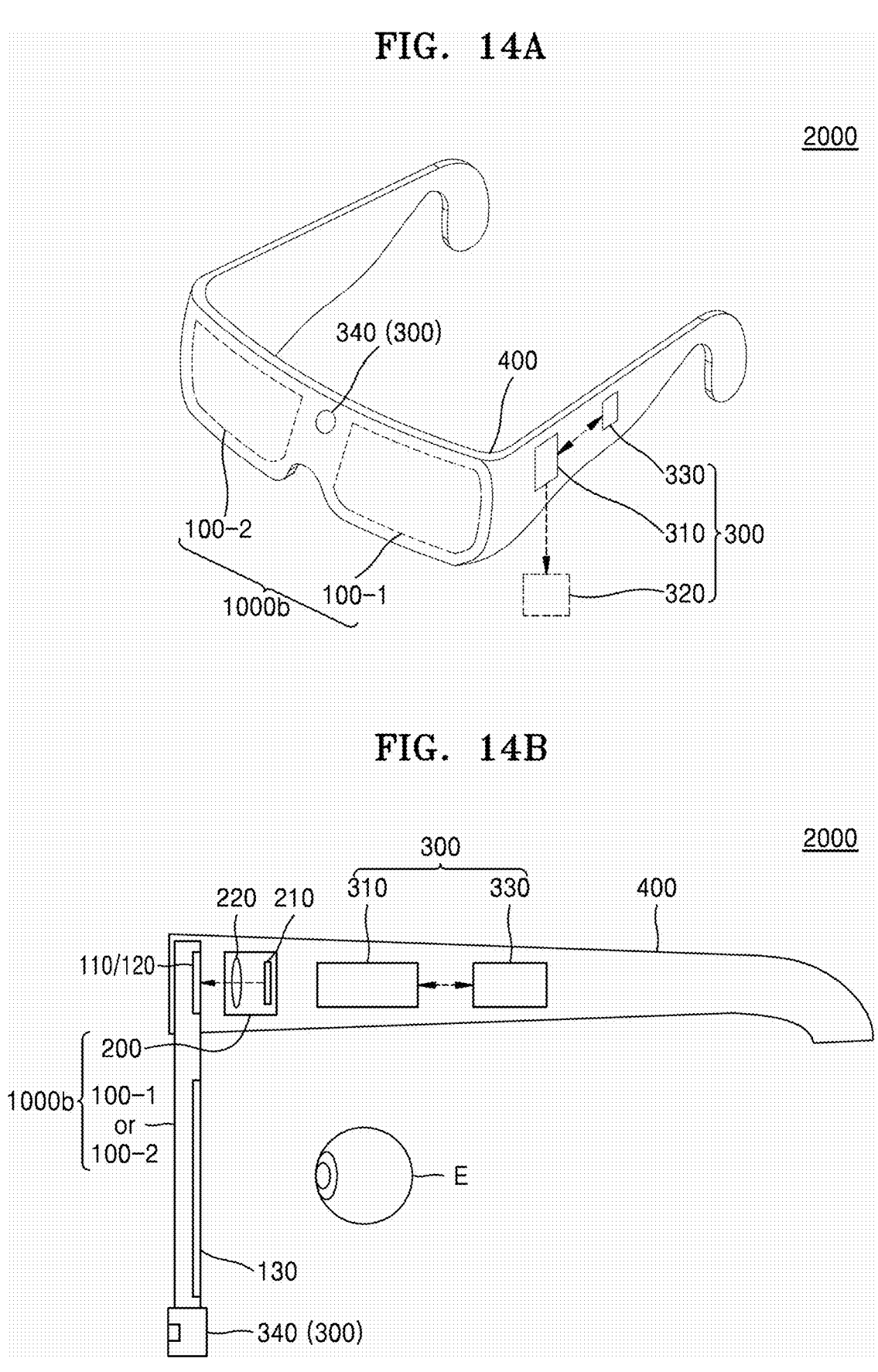
FIGS. 14A and 14B are respectively a perspective view and a side view of an augmented reality (AR) glass onto which a display apparatus is mounted, according to an embodiment.

FIGS. 14A and 14B are respectively a perspective view and a side view of an AR glass onto which a display apparatus is mounted, according to an embodiment. Descriptions that have been provided with reference to FIGS. 1A to 5, 12, and 13 may be briefly given and omitted.

Referring to FIGS. 14A and 14B, an AR glass 2000 (hereinafter, referred to as an "AR glass") onto which a display apparatus is mounted may include a display apparatus 1000b, a computing system 300, and a glass body 400.

The display apparatus 1000b may be similar to the display apparatus 1000 of FIG. 12. However, the display apparatus 1000b may differ from the display apparatus 1000 of FIG. 12 in that two optical devices for EPE are included. For example, in the AR glass 2000 according to an embodiment, the display apparatus 1000b may include a first optical device for EPE 100-1 and a second optical device for EPE 100-2, respectively corresponding to both eyes. Also, the display apparatus 1000b may include the image generator 200 that provides a virtual image.

According to an embodiment, in the AR glass 2000, the display apparatus 1000a of FIG. 13 may be modified. For example, the AR glass 2000 may include a display apparatus including the first and second optical devices for EPE 100-1 and 100-2, respectively corresponding to both eyes, and the holographic image generator 200a.

The computing system 300 may include a mounted computing module 310 and a remote computing module 320. The computing system 300 may also include an inertial sensor 330 and an environment sensor 340. The computing system 300 may control a virtual image of the image generator 200, based on information obtained from the inertial sensor 330 or the environment sensor 340. For example, the inertial sensor 330 may sense location, orientation, sudden acceleration, and the like, and a result of the sensing by the inertial sensor 330 may be reflected in the virtual image of the image generator 200 through the mounted computing module 310. Also, the environment sensor 340 may be various types of cameras, and images obtained by the environment sensor 340 may be reflected in the virtual image of the image generator 200 through the mounted computing module 310.

In addition, the remote computing module 320 may supply power to the mounted computing module 310 by wire or wirelessly. Also, the remote computing module 320 may supply a resource required by the display apparatus 1000b through the mounted computing module 310. According to an embodiment, the computing system 300 may include a global positioning system (GPS) receiver.

The glass body 400 may largely include a lens portion and a leg portion. As shown in FIG. 14A, the display apparatus 1000b may be mounted onto the lens portion of the glass body 400, and the computing system 300 may be mounted onto the leg portion of the glass body 400. In addition, an arrangement structure of the computing system 300 on the glass body 400 is not limited to an arrangement structure shown in FIGS. 14A and 14B. For example, the computing system 300 may be arranged with various structures in various portions of the glass body 400.

Figure 15:
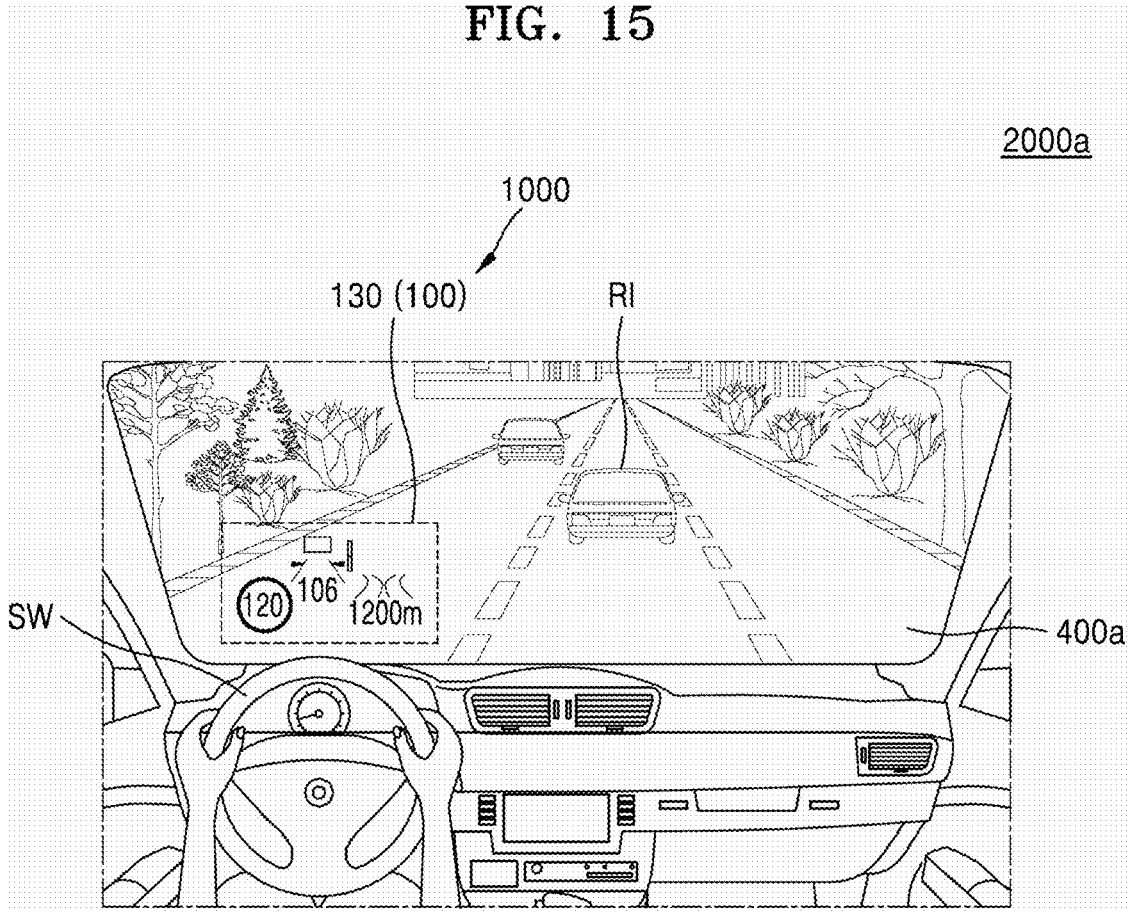
FIG. 15 is a conceptual view of a vehicle AR apparatus, onto which a display apparatus is mounted, according to an embodiment.

FIG. 15 is a conceptual view of a vehicle AG apparatus, onto which a display apparatus is mounted, according to an embodiment. Descriptions that have been provided with reference to FIGS. 1A to 5 and 12 to 14 may be briefly given and omitted.

Referring to FIG. 15, a vehicle AR apparatus 2000a (hereinafter, referred to as a "vehicle AR apparatus") onto which a display apparatus is mounted may include a display apparatus 1000 and a vehicle body 400a. The display apparatus 1000 may be the display apparatus 1000 of FIG. 12. However, the one or more embodiments are not limited thereto, and the vehicle AR apparatus 2000a may include the display apparatus 1000a of FIG. 13. In FIG. 15, in the display apparatus 1000, the input part 110, the 1D EPE area 120, the image generator 200, and the like are omitted, and only the 2D EPE area 130 is shown.

The vehicle body 400a may be, for example, a vehicle windshield. Also, the display apparatus 1000 may be mounted onto or included in a portion of the vehicle body 400a that is within a driver's FOV. For example, as shown in FIG. 15, the display apparatus 1000 may be arranged on a windshield of the vehicle body 400a above a steering wheel SW. However, the position of the display apparatus 1000 is not limited thereto. In FIG. 15, RI may refer to a real image.

The AR devices, for examples AR glass 2000 and a vehicle AR apparatus 2000a onto which one or more of the display apparatuses 1000, 1000a, and 1000b are mounted, have been described with reference to FIGS. 14A to 15. However, types of AR devices onto which the display apparatus of the one or more embodiments are not limited thereto. For example, the display apparatuses 1000, 1000a, and 1000b may be mounted onto various AR devices in a head-down display (HDD) or head-up display (HUD) method. Thus, the inventive concept of the disclosure may extend to any display apparatus including the optical device for EPE 100, and various AR devices onto which the display apparatus is mounted.

While the inventive concept has been particularly shown and described with reference to embodiments thereof, it should be understood that various changes in form and details may be made therein without departing from the spirit and scope of the following claims.

What is claimed is:

1. An optical device for exit pupil expansion (EPE) comprising:

an input part into which a virtual image is input; and an EPE part configured to receive the virtual image from the input part, perform one-dimensional (1D) EPE and two-dimensional (2D) EPE to combine the virtual image with an external real image to obtain a combined image, and output the combined image, wherein the EPE part comprises a 1D EPE area configured to perform the 1D EPE and a 2D EPE area configured to perform 2D EPE, wherein the 1D EPE area is formed in a line grating, wherein the line grating extends in a slope direction having a slope of 45° in a first direction, and has a first width and a first pitch in a direction perpendicular to the slope direction, wherein the virtual image from the input part is input into the 2D EPE area through the line grating of the 1D EPE area, wherein a grating-free gap is between the 1D EPE area and the 2D EPE area, the grating-free gap having a constant width based on a surface of the 1D EPE area and a surface of the 2D EPE area being parallel to each other, wherein the 2D EPE area is formed in a rhombus grating, wherein the rhombus grating is arranged such that the virtual image output from the line grating in a second direction perpendicular to the first direction travels in both the second direction and at a first angle with respect to the second direction, wherein the rhombus grating has a shape in which a first line grating having a second angle in a clockwise direction with respect to the second direction and a second line grating having a second angle in a counterclockwise direction with respect to the second direction, wherein the second angle is less than 45°, and the first angle varies according to the second angle, wherein the first line grating has a second width and a second pitch in a direction perpendicular to a direction in which the first line grating extends, and wherein the second line grating has a third width and a third pitch in a direction perpendicular to a direction in which the second line grating extends.

2. The optical device of claim 1, wherein the 1D EPE area is arranged in both directions of the first direction with respect to the input part, and wherein the 2D EPE area is arranged adjacent to the input part and the 1D EPE area in the second direction.

3. The optical device of claim 1, wherein the line grating is arranged such that at least portion of the virtual image traveling in the first direction is refracted to travel in the second direction.

4. The optical device of claim 1, wherein a cross-section of the line grating perpendicular to the slope direction has at least one from among a serrated shape, a rectangular shape, and a parallelogram shape.

5. The optical device of claim 1, wherein the EPE part is formed as a waveguide.

6. The optical device of claim 1, wherein the input part comprises a line grating, and the virtual image is input to the input part in a third direction perpendicular to the first direction and the second direction, and moves in the first direction, and wherein the virtual image is output from the 2D EPE area in the third direction.

7. The optical device of claim 6, wherein the virtual image is output from a side of the 2D EPE area in the third direction, and the external real image is input from another side of the 2D EPE area, and wherein the virtual image is combined with the external real image to generate a holographic image in the 2D EPE area, and output from the side of the 2D EPE area.

8. A display apparatus comprising:

an image generator configured to generate a virtual image; and an optical device for exit pupil expansion (EPE) configured to receive the virtual image and perform the EPE to combine the virtual image with an external real image, wherein the optical device comprises:

an input part into which the virtual image is input; and an EPE part configured to receive the virtual image from the input part, perform one-dimensional (1D) EPE and two-dimensional (2D) EPE to combine the virtual image with the external real image, and output the combined image, wherein the EPE part comprises a 1D EPE area configured to perform the 1D EPE and a 2D EPE area configured to perform 2D EPE, wherein the 1D EPE area is formed in a line grating, wherein the line grating extends in a slope direction having a slope of 45° in a first direction, and has a first width and a first pitch in a direction perpendicular to the slope direction, wherein the virtual image from the input part is input into the 2D EPE area through the line grating of the 1D EPE area, and wherein a grating-free gap is between the 1D EPE area and the 2D EPE area, the grating-free gap having a constant width based on a surface of the 1D EPE area and a surface of the 2D EPE area being parallel to each other, wherein the 2D EPE area is formed in a rhombus grating, wherein the rhombus grating is arranged such that the virtual image output from the line grating in a second direction perpendicular to the first direction travels in both the second direction and at a first angle with respect to the second direction, wherein the rhombus grating has a shape in which a first line grating having a second angle in a clockwise direction with respect to the second direction and a second line grating having a second angle in a counterclockwise direction with respect to the second direction, wherein the second angle is less than 45°, and the first angle varies according to the second angle, wherein the first line grating has a second width and a second pitch in a direction perpendicular to a direction in which the first line grating extends, and wherein the second line grating has a third width and a third pitch in a direction perpendicular to a direction in which the second line grating extends.

9. The display apparatus of claim 8, wherein the 1D EPE area is arranged in both directions of the first direction with respect to the input part, and wherein the 2D EPE area arranged adjacent to the input part and the 1D EPE area in the second direction.

10. The display apparatus of claim 9, wherein the line grating is arranged such that at least a portion of the virtual image traveling in the first direction is refracted to travel in the second direction.

11. The display apparatus of claim 9, wherein the input part comprises a line grating, and the virtual image is input to the input part in a third direction perpendicular to the first direction and the second direction and moves in the first direction, wherein the virtual image is output from the 2D EPE area in the third direction, and wherein the virtual image is output from a side of the 2D EPE area in the third direction, and the external real image is input from another side of the 2D EPE area, and wherein the virtual image is combined with the external real image in the 2D EPE area, and output from the side of the 2D EPE area.

12. The display apparatus of claim 8, wherein the display apparatus is an augmented reality (AR) glass or a vehicle AR apparatus.

13. A display apparatus comprising:

an image generator configured to generate a virtual image;

an optical device for exit pupil expansion (EPE) configured to receive the virtual image and perform the EPE to combine the virtual image with an external real image; and a body onto which the image generator and the optical device for EPE are mounted, wherein the optical device for EPE comprises:

an input part into which the virtual image is input; and an EPE part configured to receive the virtual image from the input part, perform one-dimensional 1D EPE and two-dimensional (2D) EPE to combine the virtual image with the external real image, and output the combined image, wherein the EPE part comprises a 1D EPE area configured to perform the 1D EPE and a 2D EPE area configured to perform 2D EPE, wherein the 1D EPE area is formed in a line grating, wherein the line grating extends in a slope direction having a slope of 45° in a first direction, and has a first width and a first pitch in a direction perpendicular to the slope direction, wherein the virtual image from the input part is input into the 2D EPE area through the line grating of the 1D EPE area, and wherein a grating-free gap is between the 1D EPE area and the 2D EPE area, the grating-free gap having a constant width based on a surface of the 1D EPE area and a surface of the 2D EPE area being parallel to each other, wherein the 2D EPE area is formed in a rhombus grating, wherein the rhombus grating is arranged such that the virtual image output from the line grating in a second direction perpendicular to the first direction travels in both the second direction and at a first angle with respect to the second direction, wherein the rhombus grating has a shape in which a first line grating having a second angle in a clockwise direction with respect to the second direction and a second line grating having a second angle in a counterclockwise direction with respect to the second direction, wherein the second angle is less than 45°, and the first angle varies according to the second angle, wherein the first line grating has a second width and a second pitch in a direction perpendicular to a direction in which the first line grating extends, and wherein the second line grating has a third width and a third pitch in a direction perpendicular to a direction in which the second line grating extends.

14. The display apparatus of claim 13, wherein the 1D EPE area is arranged in both directions of the first direction with respect to the input part and is configured to change the virtual image from the first direction to the second direction, and wherein the 2D EPE area arranged adjacent to the input part and the 1D EPE area in the second direction.

15. The display apparatus of claim 14, wherein the input part comprises a line grating, and the virtual image is input to the input part in a third direction perpendicular to the first direction and the second direction and moves in the first direction, wherein the virtual image is output from the 2D EPE area in the third direction, and wherein the virtual image is output from a side of the 2D EPE area in the third direction, and the external real image is input from another side of the 2D EPE area, and wherein the virtual image is combined with the external real image in the 2D EPE area, and output from the side of the 2D EPE area.

16. The display apparatus of claim 13, wherein the body is an augmented reality (AR) glass or a vehicle AR apparatus.

\* \* \* \* \*